(12) United States Patent
Rijnders

(10) Patent No.: US 10,540,537 B2
(45) Date of Patent: *Jan. 21, 2020

(54) METHOD FOR IMAGE PROCESSING FOR CONTENT DETECTION WITH SPARSE ZONE SALIENT FEATURES

(71) Applicant: COGISEN S.R.L., Naples (IT)

(72) Inventor: Christiaan Erik Rijnders, Rome (IT)

(73) Assignee: COGISEN S.R.L., Naples (IT)

( * ) Notice: Subject to any disclaimer, the term of this patent is extended or adjusted under 35 U.S.C. 154(b) by 61 days.

This patent is subject to a terminal disclaimer.

(21) Appl. No.: 15/899,301

(22) Filed: Feb. 19, 2018

(65) Prior Publication Data

US 2018/0239952 A1 Aug. 23, 2018

(30) Foreign Application Priority Data

Feb. 17, 2017 (EP) ..................................... 17156741

(51) Int. Cl.
*G06K 9/00* (2006.01)
*G06K 9/52* (2006.01)
(Continued)

(52) U.S. Cl.
CPC .......... *G06K 9/00201* (2013.01); *G06F 17/11* (2013.01); *G06F 17/16* (2013.01);
(Continued)

(58) Field of Classification Search
CPC .. G06K 9/00201; G06K 9/522; G06K 9/6232; G06K 9/6267; G06F 17/11; G06F 17/16; G06T 2207/20076
See application file for complete search history.

(56) References Cited

U.S. PATENT DOCUMENTS

| 2009/0238466 | A1 | 9/2009 | Golan et al. |
| 2015/0310303 | A1* | 10/2015 | Andreopoulos ..... G06K 9/4676 382/158 |
| 2018/0240221 | A1 | 8/2018 | Rijnders |

FOREIGN PATENT DOCUMENTS

| EP | 3364342 A1 | 8/2018 |
| EP | 3364343 A1 | 8/2018 |

OTHER PUBLICATIONS

Avraham T. et al., "Esaliency (extended saliency): Meaningful attention using stochastic image modeling." *IEEE Transactions on Pattern Analysis and Machine Intelligence*, 32, pp. 693-708 (2010) 17 pages.

(Continued)

*Primary Examiner* — Richard T Torrente
(74) *Attorney, Agent, or Firm* — Steinfl + Bruno, LLP

(57) ABSTRACT

A method for content detection based on images or a digital video stream of images, to enhance and isolate frequency domain signals representing content to be identified, and decrease or ignore frequency domain noise with respect to the content. A digital image or sequence of digital images defined in a spatial domain are obtained. One or more pairs of sparse zones are selected, each pair generating a feature, each zone defined by two sequences of spatial data. The selected features are transformed into frequency domain data. The transfer function, shape and direction of the frequency domain data are varied for each zone, thus generating a normalized complex vector for each feature. The normalized complex vectors are then combined to define a model of the content to be identified.

10 Claims, 17 Drawing Sheets

(51) Int. Cl.
    G06F 17/16    (2006.01)
    G06K 9/62     (2006.01)
    G06F 17/11    (2006.01)
(52) U.S. Cl.
    CPC .......... *G06K 9/522* (2013.01); *G06K 9/6232* (2013.01); *G06T 2207/20076* (2013.01)

(56) References Cited

OTHER PUBLICATIONS

Bian P. et al., "Biological plausibility of spectral domain approach for spatiotemporal visual saliency." *International conference on neural information processing*, Part 1, LNCS 5506, pp. 251-258, (Nov. 2008) 2 pages.

Borji A. et al., "Quantitative Analysis of Human-Model Agreement in Visual Saliency Modeling: A Comparative Study" *IEEE Transactions on Image Processing*, vol. 22, Issue 1, pp. 55-69 (Jan. 2013) 16 pages.

Bruce N. et al., "Saliency based on information maximization" *Advances in neural information processing systems*, 18, p. 155 (2006) 8 pages.

Bruce N.D. "An attentional framework for stereo vision" *Computer and Robot Vision*, 2005. Proceeding. The 2nd Canadian Conference on, pp. 88-95, (2005) 8 pages.

Caviedes J.E. et al., "Closed-loop video processing for objective quality optimization." IEEE Signal Processing Conference, pp. 1-4, (2005) 4 pages.

Cerf M. et al., "Using semantic content as cues for better scanpath prediction" *Proceedings of the 2008 symposium on Eye tracking research & applications*, pp. 143-146. (Mar. 2008) 5 pages.

Gao D. et al., "Discriminant Saliency for Visual Recognition from Cluttered Scenes" *Proceedings of Neural Information Processing Systems*, (2004) 8 pages.

Garcia-Diaz A. et al., "Decorrelation and distinctiveness provide with human-like saliency." *International Conference on Advanced Concepts for Intelligent Vision Systems*, LNCS 5807, pp. 343-354, (Sep. 2009) 13 pages.

Goferman S. et al., "Context-aware saliency detection." IEEE Transactions on Pattern Analysis and Machine Intelligence, vol. 34, No. 10, pp. 1915-1926, Oct. 2012. 12 pages.

Guo C. et al., "A novel multiresolution spatiotemporal saliency detection model and its applications in image and video compression." *IEEE transactions on image processing*, vol. 19(1), pp. 185-198, (2010) 14 pages.

Guo C. et al., "Spatio-temporal saliency detection using phase spectrum of quaternion Fourier transform" *IEEE Conference on Computer Vision and Pattern Recognition*, pp. 1-8, (Jun. 2008) 8 pages.

Hamed T. et al., "Fast and efficient saliency detection using sparse sampling and kernel density estimation" *Proceedings of the 17th Scandinavian conference on Image analysis*, (May 1, 2011), pp. 666-675. 10 pages.

Harel J. et al., "Graph-based visual saliency." *NIPS* (vol. 1, No. 2. p. 5) (Dec. 2006) 8 pages.

Hou X. et al., "Saliency Detection: A Spectral Residual Approach." *IEEE Conference on Computer Vision and Pattern Recognition* pp. 1-8 (2007) 9 pages.

Itti L. et al., "A Model of Saliency-Based Visual Attention for Rapid Scene Analysis," *IEEE Transactions on Pattern Analysis and Machine Intelligence*, 20(11): pp. 1254-1259 (1998) 6 pages.

Itti L. et al., "Bayesian Surprise Attracts Human Attention" *Advances in Neural Information Processing Systems*, vol. 19, (2006) 8 pages.

Judd T. et al., "Learning to predict where humans look." 2009 *IEEE 12th International Conference on Computer Vision*, pp. 2106-2113, (Sep. 2009) 8 pages.

Kahneman D. et al., "The reviewing of object files: Object-specific integration of information." *Cognitive psychology*, vol. 24(2), pp. 175-219 (1992) 45 pages.

Kienzle W. et al., "A nonparametric approach to bottom-up visual saliency." *Advances in neural information processing systems*, vol. 19, p. 689 (2007) 8 pages.

Koch C. et al., "Shifts in selective visual attention: towards the underlying neural circuitry" *Human Neurobiology* 4:219-227 (1985) 9 pages.

Kootstra G. et al., "Paying attention to symmetry" *British Machine Vision Conference*, pp. 1115-1125. (2008) 11 pages.

Le Meur O. et al., "A coherent computational approach to model bottom-up visual attention." *IEEE Transactions on Pattern Analysis and Machine Intelligence* 28(5): pp. 802-817 (2006) 17 pages.

Li E. et al., "Spatio-temporal saliency perception via hypercomplex frequency spectral contrast." *Sensors*, vol. 13(3), pp. 3409-3431, (2013) 23 pages.

Li J. et al., "Finding the secret of image saliency in the frequency domain." *IEEE transactions on pattern analysis and machine intelligence*, vol. 37(12), pp. 2428-2440 (2015) 13 pages.

Li J. et al., "Visual saliency based on scale-space analysis in the frequency domain." *Journal of Latex Class Files*, vol. 6, No. 1, (Jan. 2007) 16 pages.

Li L.J. et al., "Object bank: A high-level image representation for scene classification & semantic feature sparsification." *Advances in neural information processing systems*, pp. 1378-1386, (2010) 9 pages.

Li Z. et al., "Visual attention guided bit allocation in video compression." *Image and Vision Computing*, vol. 29(1), p. 1-14, (2011) 14 pages.

Ma Y-F. et al., "Contrast-based image attention analysis by using fuzzy growing." *Proceedings of the eleventh ACM international conference on Multimedia*—MULTIMEDIA'03, 2003 pp. 374-381.8 pages.

Mahadevan V. et al., "Anomaly detection in crowded scenes" *Computer Vision and Pattern Recognition*, pp. 1975-1981, (2010) 7 pages.

Mancas M. et al., "A Three-Level Computational Attention Model." *Proceedings of ICVS Workshop on Computational Attention & Applications* (2007) 10 pages.

Marat S. et al., "Modelling spatio-temporal saliency to predict gaze direction for short videos." *International Journal of Computer Vision*, Springer Verlag, 2009, 82(3), pp. 231-243 12 pages.

Mishra A.K. et al., "Active visual segmentation" IEEE transactions on pattern analysis and machine intelligence, 34(4), pp. 639-653 (2012) 15 pages.

Muddamsetty S.M. "Spatio-Temporal Saliency Detection in Dynamic Scenes using Local Binary Patterns." *Pattern Recognition*, pp. 2353-2358, (Aug. 2014) 6 pages.

Non-Final Office Action for U.S. Appl. No. 15/899,331, filed Feb. 19, 2018 on behalf of Cantaluppi & Partners S.R.L. dated Jun. 25, 2019. 9 pages.

Peters R.J. et al., "Beyond bottom-up: Incorporating task-dependent influences into a computational model of spatial attention." *Computer Vision and Pattern Recognition*, p. 1-8, (Jun. 2007) 8 pages.

Schauerte B. et al., "Quaternion-based spectral saliency detection for eye fixation prediction" *Computer Vision-ECCV*, pp. 116-129 (2012) 14 pages.

Seo H.J. et al., "Static and space-time visual saliency detection by self-resemblance" *Journal of Vision*, vol. 9(12), pp. 15 (2009) 27 pages.

Torralba A. "Contextual Priming for Object Detection" *International Journal of Computer Vision*, vol. 53 (2): 169-191 (2003) 23 pages.

Wolfe J.M. et al., "Visual search in continuous, naturalistic stimuli." *Vision research*, vol. 34(9), pp. 1187-1195 (1994) 9 pages.

\* cited by examiner

Any image shape can be used as input

METHOD FOR IMAGE PROCESSING FOR CONTENT DETECTION WITH SPARSE ZONE SALIENT FEATURES

CROSS REFERENCE TO RELATED APPLICATIONS

The present application claims priority to European Patent Application No. 17156741.5 filed on Feb. 17, 2017, the contents of which are incorporated herein by reference in its entirety.

BACKGROUND OF THE INVENTION

1. Field of the Invention

The present disclosure is related to a method for the detection of content, intended to be built in any kind of device, possibly a common device, provided with suitable means for digitalizing images. The method is particularly useful for creating temporal models to use in digital video streams, although not limited to digital video streams.

Content is meant to be any object which could be interesting to detect. Then, the concept of content is not limited to objects, i.e. physical items visible through the images, but also objects family selected by argument or kind, e.g. images expressing violence, showing nudities, displaying sport activities, faces in a crowd, identifying vehicles and selecting them by kind or size, discerning pedestrians, cyclists and traffic signals for self-driving vehicle systems, recognizing places or landscapes, and so on. Any field including a step of detecting a certain content among others may be involved in the present invention.

A common device is meant to be an easily commercially available electronic device like a smartphone, a tablet, a laptop or any portable or hand-held device with a suitable digital video camera. On the other hand, the device may be represented by one or more cameras, possibly organized in a network, linked to either a computer or to server for the image computing. Besides, the detection method may be simply implemented in an offline process, on stored digital images or videos by a suitable hardware comprising a storage memory, a RAM memory and at least a microprocessor, through a software run in the hardware.

The present disclosure also concerns a method for operating a device or a system, provided with at least a digital camera producing a video stream or a series of digital images, to obtain an object detection through both the camera and a processor of the device or system, in connection with at least one classifier model stored in a memory device, accessible by the operated device or system.

2. Description of the Prior Art

In engineering applications of image processing, approximations are increasingly no longer acceptable. Examples of such applications can be found in diagnostics and in the creation of models for simulations or in simulators. Highly non-linear, transient and dynamic effects, which have a high level of noise relative to the signal, need to be appropriately captured. An example of this application is represented by the detection of objects using only a minimal amount of information. Such detection can be requested for partially occluded objects or for objects far from the shooting camera, or even objects with many different representations and fast moving objects, or finally a combination thereof.

Content and object detection techniques in image processing are being widely applied in various contexts. By way of example and with no limitative purpose, this recognition is used in human face tagging technology on social networks, in software for the recognition of hand gestures, in automotive software for the detection of pedestrians, cyclists and vehicles, in software for the recognition of body movements, in human face detection technology for augmented reality and screens with 3D effects, in object recognition for augmented reality, in interfaces using head orientation or eye orientation tracking, in object tracking technology for security systems and finally in gaze tracking technology.

There are still specific hardware solutions for such object detection products; for example, gaze tracking and the recognition of gestures are technologies that often require either integrated infrared projectors or extra cameras for stereo vision to obtain the required accuracy.

There is a clear future trend of all these object detection technologies migrating onto the next generation of interactive interfaces and operating systems. The devices on which such technologies can be represented are, for example, smartphones, tablets, wearable hardware such as interactive glasses, but also any kind of interactive objects in future homes, offices or public places. These devices can be provided for special uses such as interactive television or intelligent homes, and they can also be used in automotive safety systems, healthcare, advertising, security camera networks, internet-of-things, next to many other possible uses.

Such technology can basically be integrated into any device or network connected device, where reprogrammable hardware is used and where video camera inputs can be added.

Adding extra hardware to devices, purely to help the functioning of object detection algorithms, implies higher costs and extra battery drain. Then, there are extra research and development costs required to create the miniature hardware, with current state-of-the-art hardware often still being too large to be integrated into most consumer electronics devices.

Besides the hardware costs, to a large degree, what is hindering the mass scale use of object detection technology on, for example, mobile hardware platforms, is that the required object detection calculations are too slow to keep up with the frame rate of the cameras or use too much of the available processing power in doing so.

Therefore, before the implementation on the next generation of operating systems and devices become feasible in mass volumes, such an object detection technology first will require software-only solutions able to process images a lot faster than the current state of the art.

This migration towards software-only solutions is also being facilitated by continuous camera technology improvements, which bring increasingly higher frame rates, better motion processing, more effective colour highlighting, keener adaptation to contrasts, smarter adaptation to light changes and increasingly higher screen resolutions. This trend will further increase the effectiveness of software-only solutions for object detection.

The need for content detection to use as little processing power as possible is intended for both saving battery life as well as for the requirement for real-time use. Real-time object detection algorithms should produce devices with more natural user interfaces. While running in real-time, object detection algorithms also need to run in the background without limiting the main processes running in the foreground.

Further, it should be noted that the required amount of calculations may exponentially grow as the input image size increases. A rise in video frame rate would also mean that there would be less time for the object detection algorithm to finish the calculations before the next video input frame arrives.

Therefore, a side effect of the increasingly high video frame rates and growing input image quality is that current state of the art object detection algorithms, will need to increasingly down-sample input images, to return to acceptable processing speeds, thus losing much of the extra information in the higher quality input image.

Such down-sampling thereby negates a large part of the advantages of having such high definition images in input for object detection.

In addition, content detection methods are required in a full mobility environment, meaning that they can be used in everyday situations without the requirement for relatively little movement between the object and the camera and without the requirement for constant lighting conditions.

Compounding these challenges for content detection is the fact that there is content that needs to be captured that is increasingly only visible in the temporal data of a video stream. Examples are the detection of violence, the detection of the intent of pedestrians, the detection of suspicious behavior on the live feed of a security camera and so forth. It means that two or more images frames of a video stream need to be cross-references in a single model. Current methods are mostly based on training on static images. In other words, videos are processed as a sequence of static images, instead of truly processing temporal data. The added complexity and processing overhead when having to cross-reference multiple frames to process a single classification model will be clear.

It is also not effective to count on the continued improvement of processing power to decrease the relative use of processing power by given algorithms, since the applications, e.g. games, scale to use the maximum of processing power, therefore always leaving a minimal amount for algorithms such as object detection to run in the background.

In view of the above, many methods are disclosed in the computer vision literature for object recognition and object tracking techniques.

In content detection, all the known methods use several kinds of features extracted from the digital images, in turn based on a plurality of methods for extracting these features. The methods for selecting and extracting the features from digital images are the roots of the object detection techniques. Different ways are also known for using such selected features: in most cases, such features are used either for training a classifier or for being correlated between sets of known features in a classifier.

The training phase for object detection methods generally takes much time because it needs the input of a considerable amount of data to create a reasonable and affordable model.

With such a trained model, the generic process for the detection of an object can be summarized as: input image, feature extraction, feature analysis and finally object classification.

Viola-Jones is one of the most commonly used object detection frameworks. The features employed by the detection framework universally involve the sums of image pixels within simple rectangular areas, which are usually converted through a grey-scale filter to slightly simplify the foreseen computations.

Such methods are called weak classifiers, requiring a great number of features (in the order of thousands) or even multiple cascades of such a great number of features to obtain an acceptable level of accuracy, and this large number of features involves the use of several search boxes and multiple repetitions of the computations.

Methods using many features, such as Viola-Jones, and techniques using tree-like cascades, such as AdaBoost, short for "Adaptive Boosting", have an inherently non-linear performance, because there is no linear correlation between the robustness of the detection of the algorithms and the number of computations required by such algorithms. For each step in detection performance, the model increases in complexity. To allow the use of such algorithms in real time applications, since the amount of processing power that can be dedicated by a conventional device to the algorithms is usually restricted while, in contrast, the amount of computations required cannot be predicted for the required level of performance of the algorithm, such techniques require the extraction of a solution space from the model, to be used for quick detection estimates before using a full model.

Other methods, such as SIFT, short for Scale-invariant feature transform, detect and describe a model of local features in images.

For any object in a digital image, interesting points on the object can be extracted to provide a model description of that object.

The SIFT features are local and based on the appearance of the object at particular interest points, and are invariant to image scale and rotation. They are also robust to changes in illumination, noise, and minor changes in viewpoint. Object description by sets of SIFT features is also robust to partial occlusion.

However, such techniques can be computationally very intensive, and to make such techniques work at high frame rates in real time often it is required to restrict the number of features and complexity of features, thus hindering the effectiveness of the model.

Other methods, often used for the detection of the human head orientation or the capturing of emotions on a human face, extract geometrical points from a digitalized frame. They rely on the correlation or on the correspondence between these points and a predetermined 2D or 3D shape model. Examples of these methods are known as Active Shape models (ASM) and Active Appearance models (AAM).

ASM methods search along profiles about the current model point positions to update the current estimate of the shape of the object. In practice, ASM technique seeks to match a set of model points to an image, constrained by a statistical model of shape.

Instead, AAM technique samples the image data and uses the differences between model and sample to update the appearance model parameters. The difference with ASM is that AAM seeks to match both the position of the model points and a representation of the texture of the object to an image.

The features of the methods mentioned above are usually extracted within the spatial domain. Methods only using calculations within the spatial domain image information have less scope for a substantial speed improvement.

Methods for content detection belonging to the prior art may also use the so called filtering kernels, shortly kernels, in the frequency domain to first accentuate discriminative features of the object to be classified and then recognized.

Then, the features that are extracted after the use of a kernel can either be the results of the sums of pixels in the transformed image or the sums of cells in the frequency domain.

Most of such methods use a pre-defined series of kernels evenly distributed in the frequency domain. An example of this technique is the use of Gabor banks. Each kernel setting results in a different image in the spatial domain which has been transformed by the kernel. The features extracted in such methods are typically the coordinates of the highest value of pixel intensity within the transformed image. Typically, around forty different Gabor filters are used in such methods.

Since the full frequency domain calculations are performed, and a transformation is required each time from spatial domain to frequency domain and then back again from frequency domain to spatial domain, such methods also require a large number of calculations.

Further, such methods often uses one of the variants of FFT, a fast version of the Fourier Transformation that speeds up the computations, with DCT being the discrete version of this. FFT requires the input images to be re-sampled, because the pixel width and pixel height of the image at the input both need to be of a size that is a power of two.

In many methods of object recognition there is a further classification step where the extracted features need to be discriminating, allowing to be recognized for a specific object. This aspect is mainly used in human face recognition, where an individual is recognized. Examples of methods for object recognition are Principal Component Analysis using eigenfaces, Linear Discriminate Analysis and Elastic Bunch Graph Matching using the Fisherface algorithm.

Methods for object detection similar to those above mentioned can also be combined with methods for object tracking. In object tracking, the dynamics of the movement of the object on the screen are followed. Commonly used methods for this are for example the Mean-Shift algorithm and Template Matching. Such algorithms have good performance for real-time usage. However such methods do not generate generic models of objects, instead learning a small sub sample of an object.

As mentioned above, commonly used content detection methods already achieve good detection rates on typical objects in images, for example the detection of faces of people posing in front of a camera. However, their use in real-time applications on common devices is still limited, because the difficulty of the detection task is greatly increasing since, in real-world uses, there can be a great number of lighting conditions, many more unexpected versions of the object to be detected and also often only a partial visibility of the object to be recognized. All these possible contingencies limit the use of many commonly used object detection methods, due to the complexity of the method detection training requested to achieve the final detection, and also for the number of calculations required by such methods to achieve the necessary robustness.

The above is not a limitation for offline processing of images for object detection, where the time elapsed for the detection is not the main constraint. However, in real-time applications object detection must work at least at the video input frame rate.

Summarizing, methods described as prior art above still are not used on a large scale in unconstrained real-world real-time applications, because with current processing power with such methods it is difficult to achieve an acceptable compromise between the robustness and the speed of the object detection. Also, importantly, the methods described in the prior art have mostly been designed for the processing of still images, and not the processing of the temporal data which only can be found when cross-referencing a sequence of frames is a dynamic video stream.

US 2009/0238466 discloses an object recognition method focused on the identification of faces, wherein the edges of a static image are determined through a pixel categorization and a congruency test.

SUMMARY OF THE INVENTION

The present method for content detection and image processing can be applied where data can be transformed frequency domain. It is not applicable to methods that are based on the direct analysis of pixel information in the spatial domain without transforming the image data into a frequency domain.

Generally, the method of the present invention can be summarized in the following: a model with a multitude of normalized complex vectors contains a representation of sparse data transformed into the frequency domain. These normalized vectors can be created from features extracted in the frequency domain from a sequence of multiple image frames, rendering the method particularly effective for models that have to capture temporal data in a video stream.

In the process, a number of features are first selected, and, after, in an offline learning phase wherein parameters for each feature such as the target frequencies, the underlying transfer functions within the transformations and the direction and sequence of the frequency transformation are optimized, the best parameter settings are selected. These features can be spread across multiple frames, thus capturing temporal processes in a video stream. The set of features is combined into a single space of normalized complex vectors in the frequency domain. This set of normalized complex vectors so describes the model in a frequency domain for content to be detected in a video or video stream.

In a deeper detail, the method for extracting and using features in the frequency domain comprises the steps of:
  obtaining a digital image, or a sequence of digital images in a video stream, defined through data in a spatial domain;
  select for the transformation into the frequency domain one or more pairs of sparse zones, each covering a portion of the frequency domain, and possibly covering 2 or more frames in a sequence of a video stream;
  transferring a sparse portion of the total frequency domain data of the image data to the frequency domain using 2D variation of a L-Transformation;
  applying an optimization of the target frequency, transfer functions and shape and direction of the input for the 2D L-Transformation for each input of each zone:
  transforming each pair of zones into a feature which is a normalized complex vector;
  combining all the created vectors together into a single model containing all the normalized complex vectors; and
  using the model of normalized complex vectors to create the input data for a classifier.

It will be clear to an expert in the field of object detection that there are several possibilities to use as the digital image input:
  The entire image is transformed,
  Segments of the image are transformed.

It will also be clear that the size of the digital input does not change the claims disclosed here.

In view of the above, the method for image processing for content detection according to the present invention is defined in appended claim 1.

Further details of the method, leading to additional advantages, are defined in the dependent claims.

The present method is hence capable to greatly increase the processing speed of detection of content and image processing methods, at the same time increasing the accuracy thereof. The present method is particularly effective at improving the effectiveness of temporal models.

As explained above, a huge need is felt for new methods able to increase the speed of content detection techniques in image processing. This speed increase should render the content detection fast enough to work in the background inside the latest generation of mobile devices and other similar devices.

Apart from use on the latest generation of mobile devices, in anticipation of future trends such as wearable hardware, the algorithms need to be able to work outside of the main personal computer operating systems and mobile operating systems and thus be programmable on processors and re-programmable hardware such as field-programmable gate arrays. The methods also need to be built up of algorithms, which can take advantage of the latest hardware developments on personal computers and mobile devices such as multi-cores and powerful graphical processing units (CPU's).

In this connection, the use of calculations in the frequency domain naturally lends itself to respond to the need for faster calculations for several reasons. This method allows for such parallel processing. It is well known by experts in this field that the many variants of FFT are not fit for programming on a processor.

It is important to underline how the method described is particularly advantageous when temporal models need to be created, which need to capture models which can only found in the dynamic and temporal sequence of frames in a video stream. In other, words, content which cannot be captured when a video stream is only considered as a sequence of still frames.

The standard frequency domain theory of Fourier states that any signal, in our case digital images, can be expressed as a sum of a series of sinusoids. In the case of image processing, these are sinusoidal variations in brightness across the image.

A sinusoidal function can encode:
the spatial frequency
the magnitude
the phase

The spatial frequency is the frequency across the space with which the brightness modulates.

The magnitude of the sinusoidal corresponds to its contrast, or the difference between the darkest and the brightest peaks of the image. The phase represents how the wave is shifted relative to the origin.

A Fourier transform encodes not just a single sinusoid, but a whole series of sinusoids through a range of spatial frequencies from zero until the "Nyquist frequency", that means the highest spatial frequency that can be encoded in the digital image, which is related to the resolution, or total number of the pixels.

The Fourier transform encodes all of the spatial frequencies present in an image simultaneously.

The Nyquist frequency is ½ of the sampling rate of a discrete signal processing system, in our case the digital image.

The underlying principle behind the Fourier transformation used for image processing is: that each pixel affects all frequencies, and each frequency affects all pixels."

The intuition behind the method disclosed here is that the position of said contrasts in the spatial domain is encoded by sinusoids in the frequency domain. Certain contrasts in the spatial domain are only affected by certain sinusoids in the frequency domain. For shapes, which are defined by a combination of contrasts in the spatial domain, it means that this shape is captured by a unique combination of positional information in the frequency domain. And it means that movement is captured by a unique change of positional information in the frequency domain.

Therefore, we can use the capturing of a specific information or change of information in the frequency domain for the detection of specific objects.

Working in the frequency domain allows for much easier calculations as multiplications with transfer functions and other similar calculations with matrices are simple component-wise multiplication, unlike in the spatial domain, where it is a convolution between two functions, which is computationally more expensive.

Therefore, the frequency domain allows for a computationally easy use of a sparse, small, part of the frequency domain information for object detection.

Sparse zones, as well as the as the transfer functions, features and format in the frequency domain, will be hereinafter explained and detailed.

Working fully in the frequency domain without requiring the calculations to transform the image back to the spatial domain after the frequency domain calculation also allows an added flexibility in the choice of the mathematics that perform the transformation into the frequency domain

BRIEF DESCRIPTION OF THE DRAWINGS

Further features and advantages of the present method will become more apparent by the following description of a preferred embodiment thereof, given by reference to the annexed drawings wherein.

DESCRIPTION OF THE EMBODIMENTS

Figure 1:
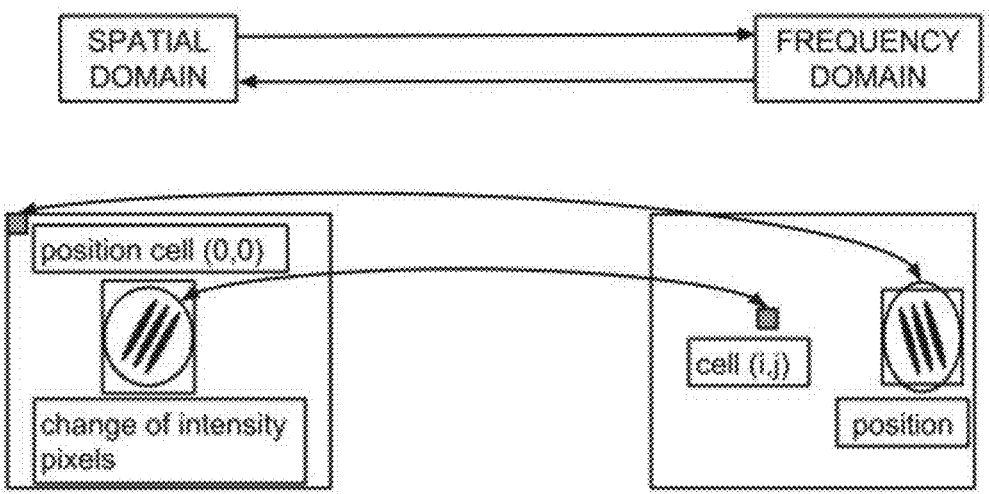
FIG. 1 shows how in the spatial domain for an image, the index indicates the position while the frequencies within the image indicate the sinusoidal changes in pixel intensity and the opposite is true within the frequency domain.

In the following, an embodiment of the method according to the present invention will be detailed with reference to the accompanying figures.

It is apparent that what is herein described with reference to a video stream, i.e. a succession of a series of image frames having a certain rate, also applies to any succession of single images, being equivalent to the frames of a video stream, and to one single image being equivalent to a single frame.

The goal of the method according to the present invention is enhancing and then isolating the frequency domain signals representing a content to be identified, and decreasing or ignoring the frequency domain noise with respect to the content within the images or the video stream.

In the first step, a search logic can be used on the full input image to generate an input frame for the calculations of this method. The search logic can for example be the whole image or a subset of the image. It should be clear that many types of search logic are possible, but that from the point of view of the method disclosed here the calculations or claims do not change, just the image input for the transformation changes. It will also be clear that a single frame can have multiple inputs for multiple calculations each of which are processed as described in the claims.

The input or inputs taken from the frame or sequence of frames are then extracted in the frequency domain. The data within the frequency domain data of the frame is then processed to detect the content. The method described here leaves open the classification used, what instead is underlined in this method is an improvement in the quality and type of data used for the classification of choice.

As mentioned above, the method described is particularly effective at the detection of objects and processes which are especially or even exclusively in the temporal data of a video stream. It shall be explained herein how multiple frames can be combined into a single input for the detection.

The detection will move to the next frame or sequence of frames of the video stream when either the object has been detected or a repetition of the search logic fails to find the object within the image. It should be clear that the search logic can be made to be adaptive, based on which object were found in the previous frame.

In the known art, processing an image in the frequency domain is generally done using a variant of the Fast Fourier Transform (FFT), but the present method neither uses FFT or its variants, for example Discrete Cosine Transform (DCT), nor uses a Discrete Fourier Transformation (DFT).

However, to highlight the differences between the conventional image processing and the present method, a generic overview of FFT and DFT is herein given.

FFT is used in a wide range of applications, such as image analysis, image reconstruction and image compression, text recognition and more.

The main principle of the FFT follows from the Discrete Fourier Transformation (DFT). Since the DFT requires a great number of calculation, there are other types of transformations which seek to speed up the process. The Fast Fourier Transformations (FFT) is the most established of these. With DFT, the number of calculation is correlated to $N^2$, where N is the length of the input matrix.

FFT algorithm relies on the fact that the standard DFT involves a lot of redundant calculations.

The FFT is computed by dividing the sample sequence into sub-sequences; at each stage N/2 complex multiplications are required to combine the results of the previous stage.

Since there are log(N) stages, the number of complex multiplications requires to evaluate on N-point DFT with the FFT is approximately N*log(N).

The number of frequencies corresponds to the number of pixels in the spatial domain image, i.e. the images in the spatial and frequency domain are of the same size.

As mentioned above, there are a number of variants of the FFT. The FFT also has its limitations in image processing. For example, the sides of the image used in input for the FFT need to have lengths in pixels which are a power of two.

Another limitation is that the full FFT needs to be calculated before results for a certain frequency can be given. In other words, the FFT cannot be converted for sparse calculations, since the entire FFT must be calculated before the value for a single frequency can be obtained. The complex structure of the FFT also does not allow for easy coding implementations on re-programmable hardware and multi-core processors. In addition, since the entire FFT first needs to be calculated to obtain single results it also requires higher use of memory on the device.

Methods, such as pruned Fast Fourier Transformations, may be provided, but they require a great deal of complex code for a relatively small gain in speed and memory use, while still being hard to implement on re-programmable hardware.

In the spatial domain, the values are usually the light intensity of the pixels, which range from 0 to 255. The Fourier domain values of the same image have a much greater range than the image in the spatial domain.

The Fourier Transform produces a complex number valued output image, which can be displayed with two images, either with the real and the imaginary part or with magnitude and phase. In the image processing, often only the magnitude of the Fourier Transform is displayed, as it contains most of the information of the geometric structure of the spatial domain image. However, to re-transform the Fourier image into the correct spatial domain after some processing in the frequency domain, one must preserve both magnitude and phase of the Fourier image.

In the method according to the present disclosure, it is made possible for all the calculations to be exclusively using the information in the frequency domain.

Since there is no need to keep all the information to return to the spatial domain, there are several advantages.

First, the lack of an extra step back to the spatial domain from the frequency domain speeds up the overall calculations.

Secondly, since the frequency domain data need not to be converted back to a correct spatial domain image, smaller sparse zone can be used. This is because it is not required to have the frequency domain data that will allow for the image data to be converted back to the spatial domain without a large loss of image quality and information. Sparse zones in the frequency domain by themselves do not necessarily contain enough frequency domain information to recreate the spatial image. But they contain enough information for classification.

Thirdly, extra calculations can be carried out to remove the aliasing that is common in FFT and also other calculations to better prepare the data for classification within the frequency domain.

Fourthly, other limits that are present in methods like FFT and DCT are removed. For example the frequency transformations for FFT and DCT are done along the rows and columns of an image and always within a single frame. In this method the directions of the frequency domain transformation can be any permutation, with much more freedom for the transfer functions and with the transformations even crossing between frames of a video sequence.

In FIG. 1 it is represented how, in the spatial domain for an image, the index indicates the position while the frequencies within the image indicate the sinusoidal changes in pixel intensity. The opposite is true within the frequency domain, the index shows the frequencies, while the sinusoidal waves contain the position data.

Figure 2:
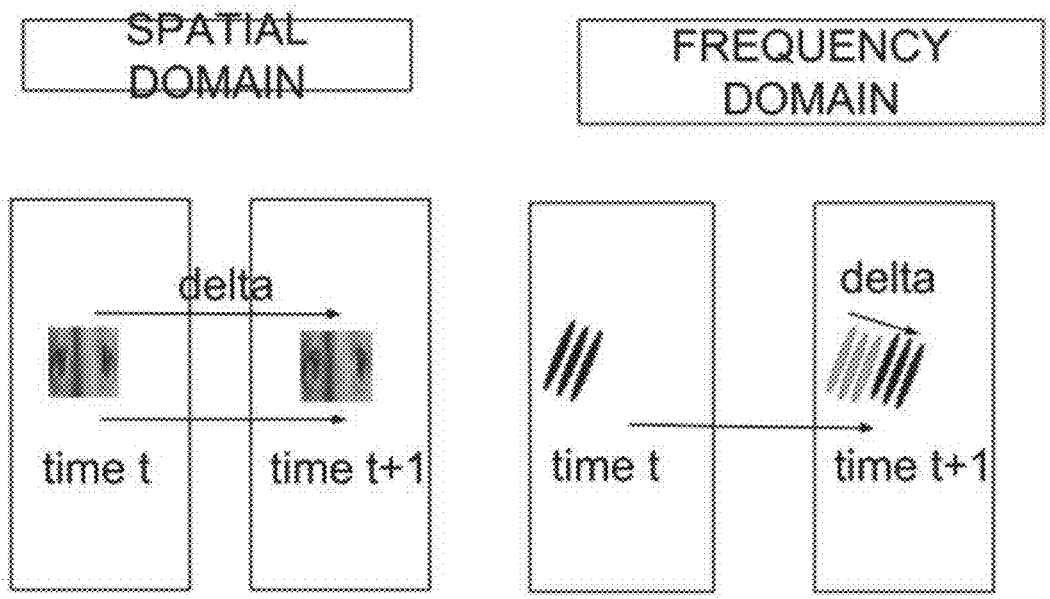
FIG. 2 shows how movement information in the spatial domain for a given object will be captured by a change in the waves that code the position in the frequency domain.

In the same way, movement information in the spatial domain for a given object will be captured by a change in the waves that code the position in the frequency domain. This is schematically shown with images of eye movements in FIG. 2.

Figure 3:
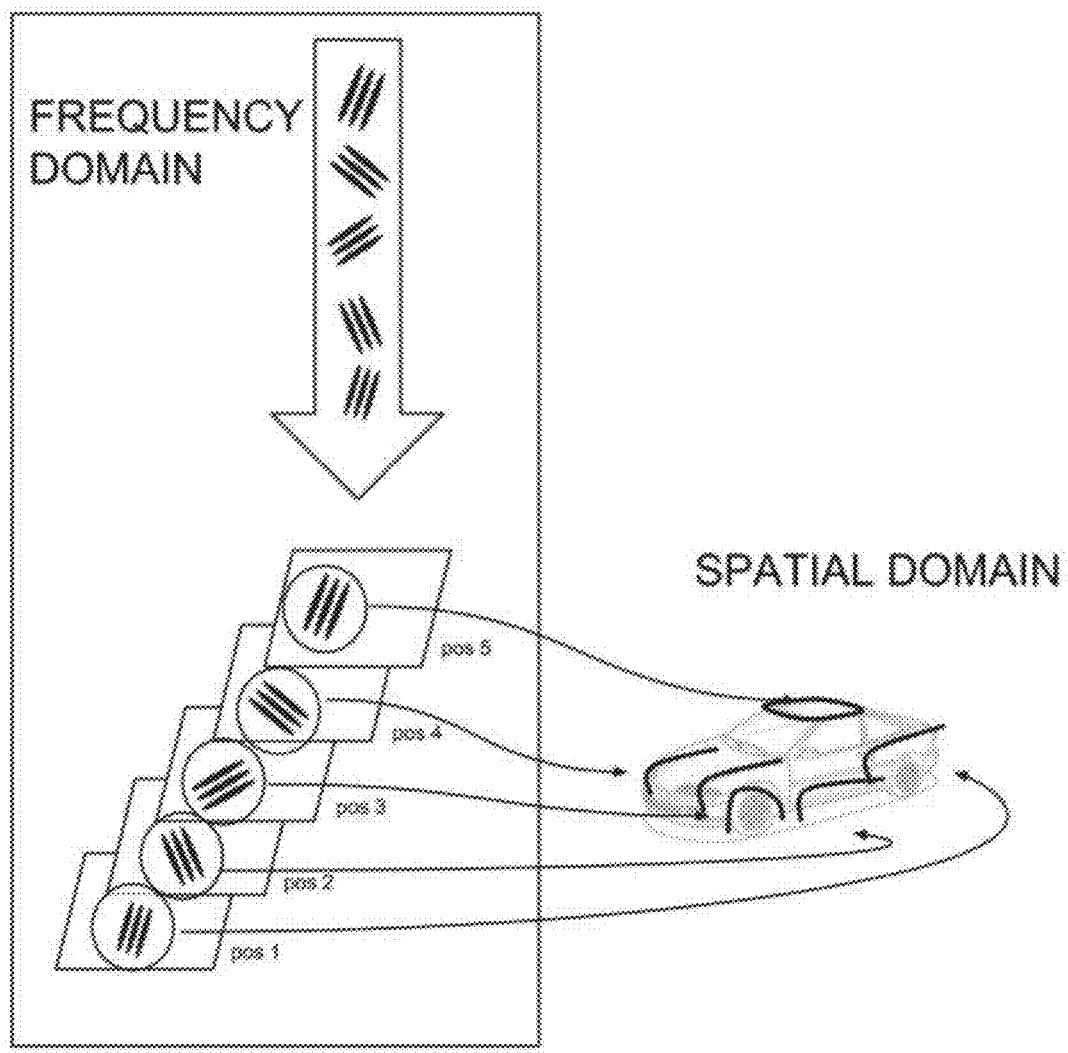
FIG. 3 shows how in the frequency domain a number of waves are required to capture enough positional and shape information to classify the object within the image.

The examples given above are of course simplified for illustrating the concepts. In practice, in the same way that in the spatial domain many frequencies which capture changes in pixel intensity are required to draw an image, in the frequency domain a number of waves are required to capture enough positional and shape information to classify the object within the image. This is represented within FIG. 3.

As mentioned above, each index within the frequency domain potentially affects all pixels in the spatial domain. Therefore, relatively less features are required in the frequency domain to classify an object, compared to classifying an object with features extracted from the spatial domain. In the object detection method herein described a technique is disclosed to find the minimal partial combinations of information in the frequency domain that capture a specific type of shape in the spatial domain. This combination of information can especially also be a sequence of frames in a video stream, with the aim of capturing temporal and dynamic information that is not found when considering each still image of a sequence by itself.

Figure 4:
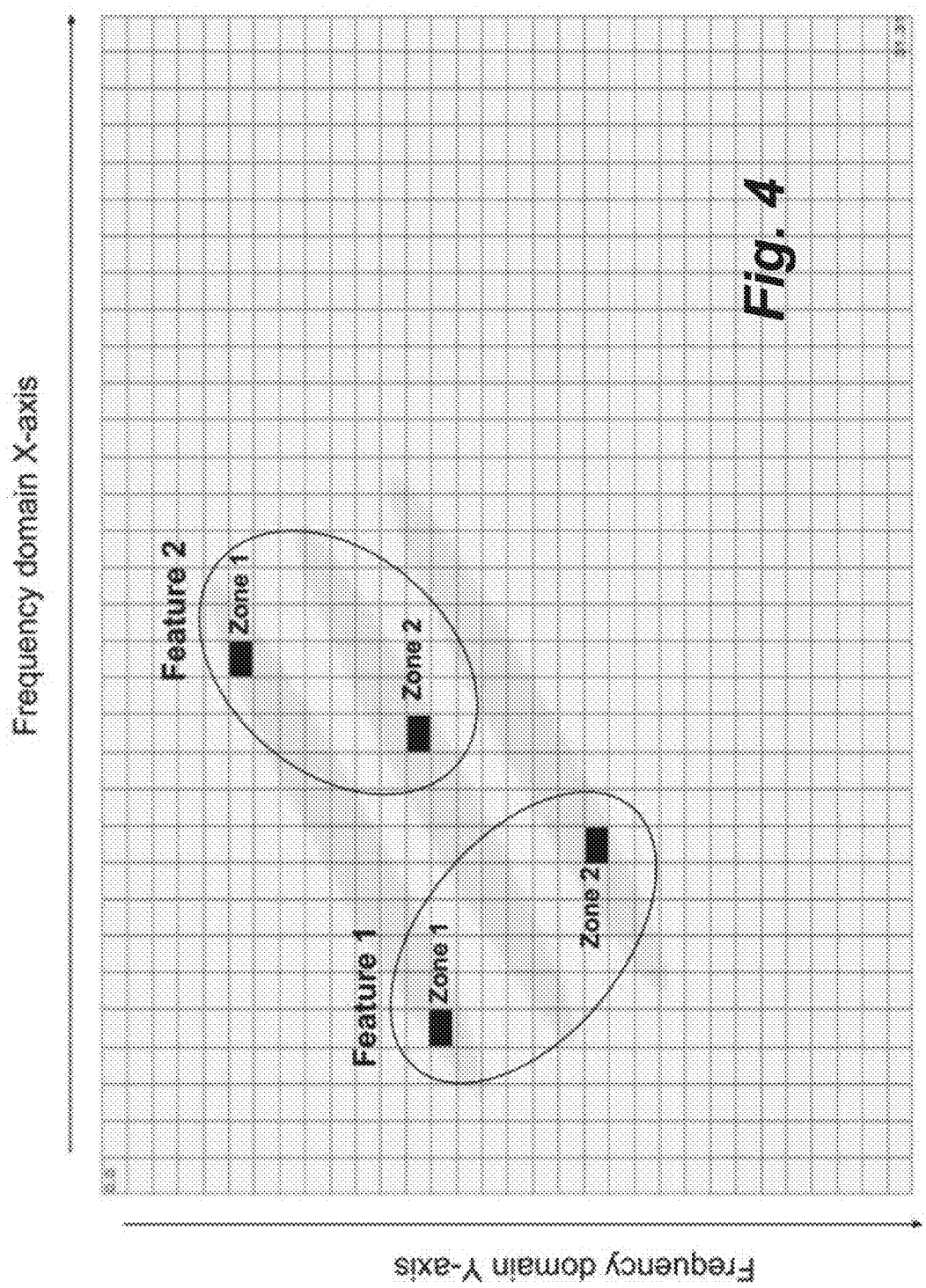
FIG. 4 shows how only a sparse part of the frequency domain information is required to capture the sinusoidal information in the frequency domain.

Here and in the following description, a sparse zone is meant to be a selection of information, covering a fraction of a frequency domain. Each zone should be seen as specific frequency domain information. FIG. 4 shows examples of layouts of sparse features in the frequency domain.

It must be noted that each feature is created from a pair of zones, and the size of the frequency domain grid is for illustrative purposes only one, but it can be of many other sizes as will be illustrated later.

FIG. 4 shows an example of a possible frequency domain sinusoidal contrast that captures position and movement in the spatial domain is also shown in overlay. What FIG. 4 shows is that only a part of the frequency domain sinusoidal contrast needs to be captured to detect the type of movement or shape in the spatial domain, which is what the sparse zones do.

The sparse zones may be grouped together, either possibly partially overlapping each other or placed side-to-side, to increase the local resolution.

Calculations on frequency values derived from said sparse zone are indicated as sparse calculations.

Since it is not required to convert the image back to the spatial domain, and not all the frequency domain information is required, it opens to the possibility to use other methods besides DFT or FFT to convert the image into the spatial domain.

According to the present method, one or more pairs of sparse zones are selected, each covering at least a portion of a single frame or, in case of a frame sequence, at least two frames of the sequence.

As mentioned above, each pair of sparse zones generates a feature, and each sparse zone is defined by two sequences of spatial data.

Then, according to the present method, said selected features are transformed into the frequency domain data by combining, for each sparse zone, said the two sequences of spatial data through a 2D variation of an L-transformation, varying the transfer function, shape and direction of the frequency domain data for each zone, thus generating a normalized complex vector for each of said features.

Hence, the transformation may be carried out using further methods such as a two-dimensional transformation derived from the Göertzel algorithm, with considerable design freedom regarding the targeted frequencies, transfer functions used in the transformation and shape and direction of the loop that defines the inputs of the transformation. As will be explained further on in this disclosure, the method used is very different to the Göertzel algorithm and so the description used is that it is a 2D variation of the L-Transformation.

As mentioned before, the advantage of this method is that it can be set up sparsely, in parallel, in a more flexible way for use on re-programmable processors or on GPU, while using a minimal amount of memory. In the following, the theory behind the Göertzel transformation is first described. After that the implementation for this method is detailed, with the extension for the 2D case in image processing and the various design options that can be used.

When a spectrum analysis in the detection and measurement of a single sinusoidal tones has to be performed, an infinite impulse response (IIR) filter structure is used.

The standard method for spectral energy is the discrete Fourier transform (DFT), typically implemented using a fast Fourier Transform (FFT) or Discrete Cosine Transformation (DCT) algorithm.

However, there are applications that require spectrum analysis only over a subset of the N-bin centre frequencies of an N-point DFT. A popular, as well as efficient, technique for computing sparse FFT results in 1D is the Göertzel algorithm, using an IIR filter implementation to compute a single complex DFT spectral bin value based upon N input time samples.

The most common application of this process it to detect the presence of a single continuous-wave sinusoidal tone. Being a 1D calculation, the Göertzel algorithm is not meant to be used for image processing, where images are 2D.

The Göertzel algorithm is based on the idea to compute the k component of the signal $\{x[n]\}$ of length N $$X[k] = \sum_{n=0}^{N-1} x[n] e^{-j2\pi k \frac{n}{N}} \quad \text{(Equation 1)}$$

Multiplying the right side of this equation (1) by $$e^{j2\pi k \frac{N}{N}} = 1$$

we have:

$$X[k] = e^{j2\pi k \frac{N}{N}} \sum_{n=0}^{N-1} x[n] e^{-j2\pi k \frac{n}{N}} \quad \text{(Equation 2)}$$

which can be written as:

$$X[k] = \sum_{n=0}^{N-1} x[n] e^{-j2\pi k \frac{n-N}{N}} \quad \text{(Equation 3)}$$

the right side of (3) can be seen as a discrete linear convolution of signals $\{x[n]\}$ and $\{h_k[n]\}$ where $$h_k[l] = e^{j2\pi k \frac{l}{N}} u[l].$$

In fact, if $\{y_k[n]\}$ denotes the result of that convolution, then we have: $\{y_k[n]\}$ $$y_k[m] = \sum_{n=-\infty}^{\infty} x[n] h_k[m-n] \quad \text{(Equation 4)}$$

which can be rewritten as:

$$y_k[m] = \sum_{n=0}^{N-1} x[n] e^{-j2\pi k \frac{m-n}{N}} u[m-n] \quad \text{(Equation 5)}$$

A convolution is defined as the integral of the product of two functions after one is 5 reversed and shifted. As such, it is a particular kind of integral transform.

The convolution theorem states that under suitable conditions the Fourier transform of a convolution is the pointwise product of Fourier transforms. In other words, convolution in one domain (e.g., time domain) equals pointwise multiplication in the other domain (e.g., frequency domain).

Comparing (3) with (5) it is obvious that the desired $X[k]$ is the Nth sample of the convolution:

$$X[k] = y_k[N] \quad \text{(Equation 6)}$$

for k=0, . . . , N−1. This means that the required value can be obtained as the output sample in time N of an IIR linear system with the impulse response $\{h_k[n]\}$.

The transfer function $H_k(z)$ of this system will now be derived; it is the L-Transform of its impulse response:

$$H_k(z) = \sum_{n=-\infty}^{\infty} h_k[n] z^{-n} \quad \text{(Equation 7)}$$

$$= \sum_{n=-\infty}^{\infty} e^{j2\pi k \frac{n}{N}} u[n] z^{-n} \quad \text{(Equation 8)}$$

$$= \sum_{n=0}^{\infty} e^{j2\pi k \frac{n}{N}} z^{-n} \quad \text{(Equation 9)}$$

$$= \sum_{0}^{\infty} \left( e^{j2\pi k \frac{1}{N}} z^{-1} \right)^n \quad \text{(Equation 10)}$$

the geometric series is convergent and its sum equals the transfer function:

$$H_k(z) = \frac{1}{1 - e^{j\frac{2\pi k}{N}} z^{-1}} \quad \text{(Equation 11)}$$

This gives the following difference equation:

$$y_k[n] = x[n] + e^{j\frac{2\pi k}{N}} y_k[n-1] \text{ with } y_k[-1] = 0 \quad \text{(Equation 12)}$$

Equation (12) involves multiplication by a complex number and each complex multiplication results in four real multiplications and four real additions.

To avoid complex multiplication, the function can be multiplied by a complex conjugate pole and simplified as follows:

$$H_k(z) = \frac{1 - e^{-j\frac{2\pi k}{N}} z^{-1}}{1 - 2\cos\left(\frac{2\pi k}{N}\right) z^{-1} + z^{-2}} \quad \text{(Equation 13)}$$

The difference equation of this IIR of second order is:

$$y_k[n] = \quad \text{(Equation 14)}$$
$$x[n] - x[n-1] e^{-j\frac{2\pi k}{N}} + 2\cos\left(\frac{2\pi k}{N}\right) y_k[n-1] - y_k[n-2]$$

and such structure can be described using the state variables:

$$s[n] = \quad \text{(Equation 15)}$$
$$x[n] - x[n-1] e^{-j\frac{2\pi k}{N}} + 2\cos\left(\frac{2\pi k}{N}\right) s[n-1] - s[n-2]$$
and we set $s[-1] = s[-2] = 0$.

$$y_k[n] = X(k) = s[n] - s[n-1] e^{-j\frac{2\pi k}{N}} \quad \text{(Equation 16)}$$

-continued $$y_k[n] = s[n] - e^{-j\frac{2\pi}{N}k}s[n-1] \quad \text{(Equation 17)}$$

$$= A - Be^{-j\theta} \quad \text{(Equation 18)}$$

$$= [A - B\cos\theta] + jB\sin\theta \quad \text{(Equation 19)}$$

$$A = s[n]$$

$$B = s[n-1]$$

$$\theta = \frac{2\pi k}{N}$$

The Göertzel algorithm in fact performs the computation of a single 1D DFT coefficient. Compared to the DFT, it has several advantages and for this reason it is sometimes used in 1D applications.

The Göertzel algorithm is advantageous in situations when only values of a few spectral components are required, not the whole spectrum. An example is the recognition of the press of a button which has a specific audio pulse. In such a case the algorithm can be significantly faster.

The efficiency of using the FFT algorithm for the computation of DFT components is strongly determined by the signal length N (N has to be a power of 2). In contrast, N can be arbitrary in the case of the Göertzel algorithm, and the computation complexity does not vary.

The computation can be initiated at an arbitrary moment, it is not necessary to wait for the whole data block as in the case of the FFT. Thus, the Göertzel algorithm can be less demanding from the viewpoint of the memory capacity, and it can perform at a very low latency. Therefore, the Göertzel algorithm does not need any reordering of the input or output data in the bit-reverse order.

1D Göertzel Algorithm

The algorithm for the 1D Göertzel has a quite basic structure. We can start from the Equation (17).

Some intermediate processing is done in every sample. As with FFT, we work with blocks of samples.

Several settings are required to initialize the calculation of the 1D Göertzel:
1. The sampling rate.
2. The block size, N.
3. The target frequency.

Once the sampling rate and block size are selected, there is a five-step process to compute the constants needed:

The constants k, w, cosine, sine and coeff are defined:

$$k = (\text{int})\left(0.5 + \frac{N*\text{target} - \text{freq}}{\text{sample} - \text{rate}}\right) \quad \text{(Equation 20)}$$

$$w = (2\pi/N)*k$$

$$\text{cosine} = \cos\omega$$

$$\text{sine} = \sin\omega$$

$$\text{coeff} = 2*\text{cosine}$$

For the per-sample processing three variables are used: S0, S1, and S2. S1 is simply the value of S0 at the last iteration. S2 is the value of S0 two iteration step ago (or in other words one iteration before S1). S1 and S2 must be initialized to zero at the beginning of each block of samples.

For every column (row) of a matrix [n×m] the following three equations are computed:

$$\{S_0 = \text{coeff}*S_1 - S_2 + \text{sample}$$

$$S_2 = S_1$$

$$S_1 = S_0$$

$$\text{real} = (S_1 - S_2*\text{cosine})$$

$$\text{imag} = (S_2*\text{sine})$$

$$\text{magnitude}^2 = \text{real}^2 + \text{imag}^2\} \quad \text{(Equation 21)}$$

This is the basic version of the 1D Göertzel algorithm. As mentioned above, it gives the same result as a 1D DFT.

A version of the 1D Göertzel can also be used which requires less computations than the basic version, at the expense of the phase information, meaning not calculating both the real and imaginary parts of the transformation. It will be clear that it is preferable to calculate both the real and imaginary parts and that the faster option is only for cases where processor overhead is very strictly capped.

In the faster version the per-sample processing is the same, but the end of block processing is different. Instead of computing real and imaginary components, and then converting those into the relative magnitude squared, the following is directly calculated, without the steps of the basic version where also the real and imaginary components are calculated:

$$\text{magnitude} = S_1^2 + S_2^2 - S_1*S_2*\text{coeff} \quad \text{(Equation 22)}$$

2D Implementation of Version of L-Transformation

It should be noted again that this common version of the Göertzel algorithm is defined for 1D calculations. In image processing the calculations this does not suffice as the calculations for transforming an image into the frequency domain need to be done in two dimensions: X and Y. Also, while a 1D implementation of Göertzel is equivalent to a 1D DFT, for 2D this will not be true. So the Göertzel algorithm would not seem to be a candidate for object detection and image processing. Another limitation for Göertzel is that there is not much ability to tune and optimize for specific signals.

However, the disclosures described the method with which to convert images to the frequency domain with a 2D implementation, starting from the principles of the 1D Göertzel algorithm, but changing them to the extent that it can be called a completely new method in 2D, herein described as a 2D variant of the L-Transformation. Also, since the calculations in this method are fully in the frequency domain, without needing to return to the spatial domain, it is not a requirement that the 2D calculations are equivalent to the 2D DFT.

Figure 5:
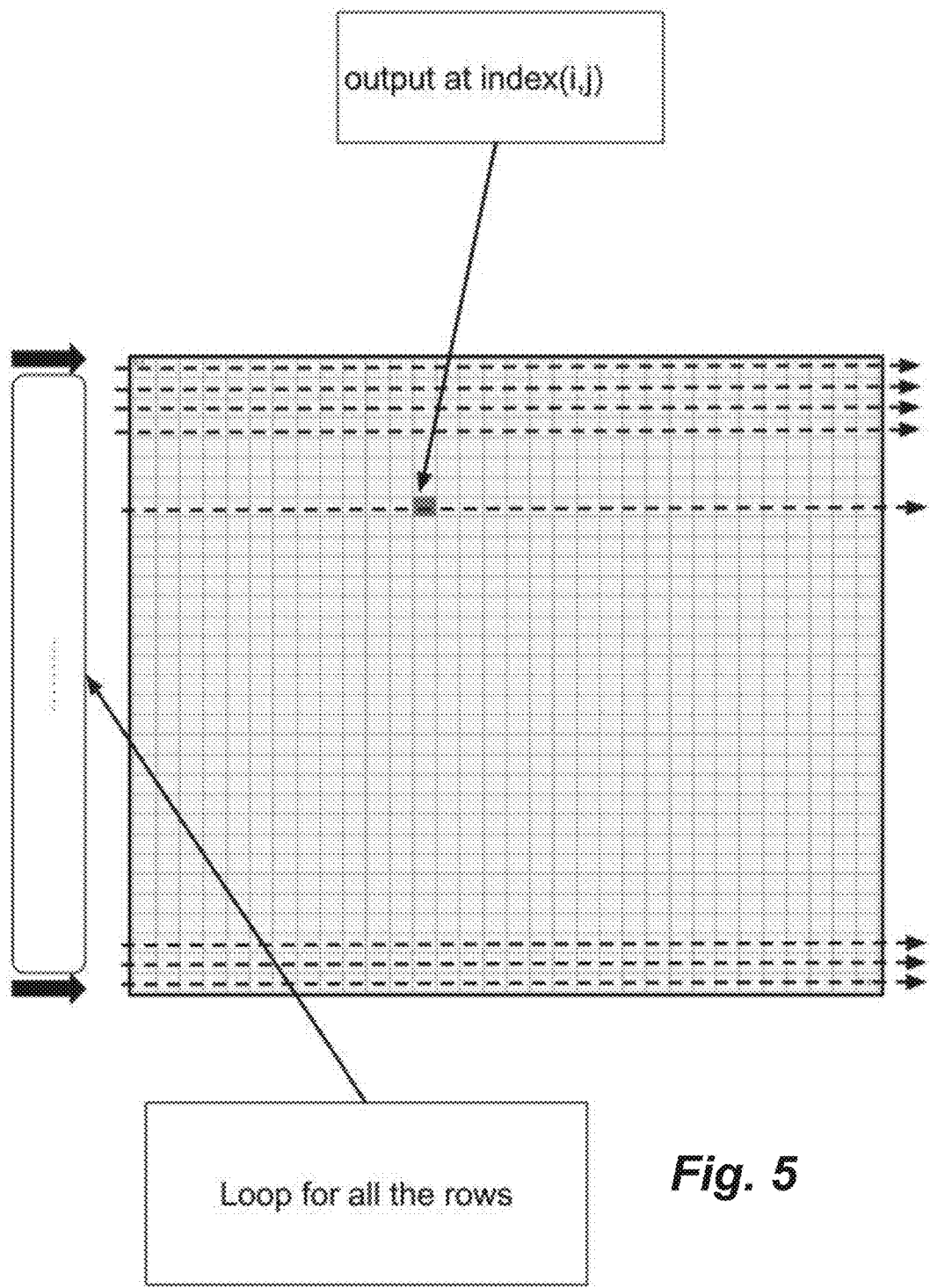
FIG. 5 and FIG. 6 show how a full 2D implementation of Göertzel in effect would be a combination of many 1D Göertzel calculations.
Figure 6:
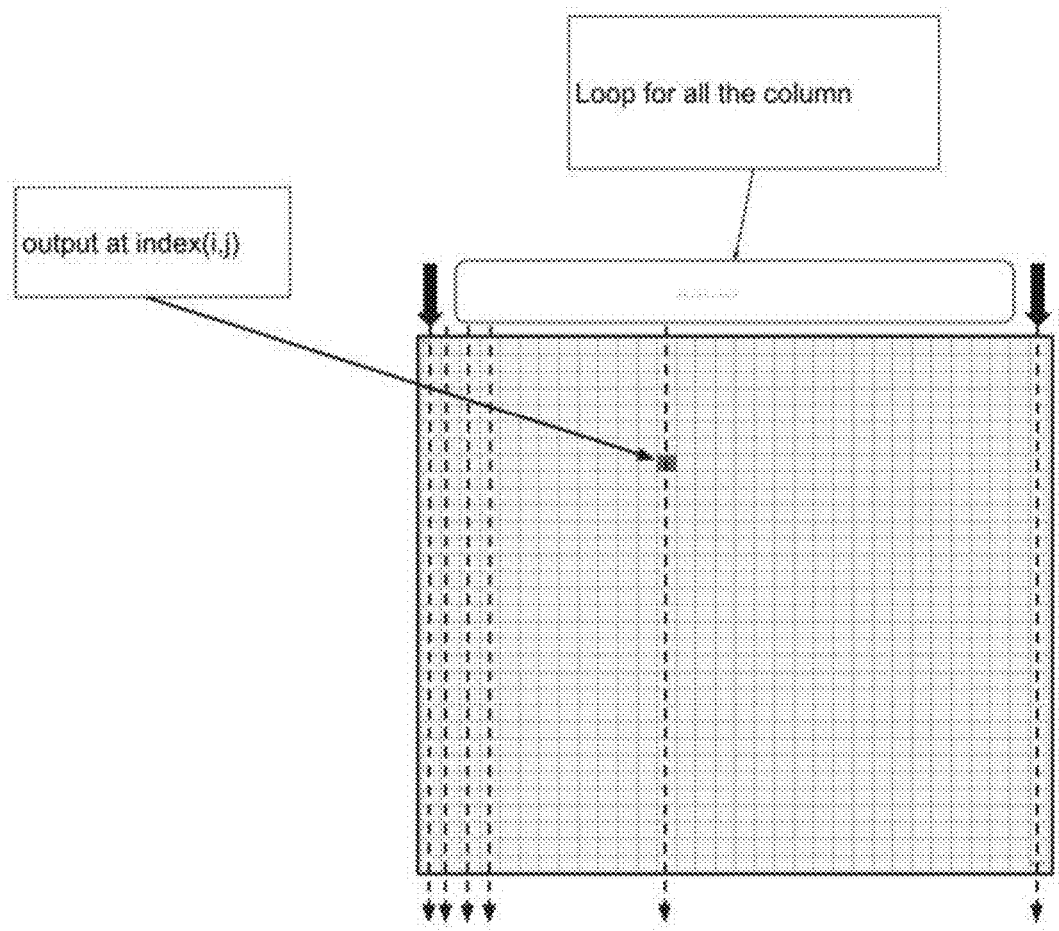

FIG. 5 and FIG. 6 show how a full 2D implementation of Göertzel in effect would be a combination of many 1D Göertzel calculations.

An option would be first to do the various 1D calculations of the rows of FIG. 5 then to use these results for a second step where all the 1D Göertzel calculations are done for the columns, like in FIG. 6. Alternatively, the columns could first be calculated followed by the rows.

Even though the method described here could use such an implementation, it is not the preferred way for several reasons. Firstly, the calculations for the rows would have to wait for the calculations for the columns to finish, or vice-versa.

Figure 7:
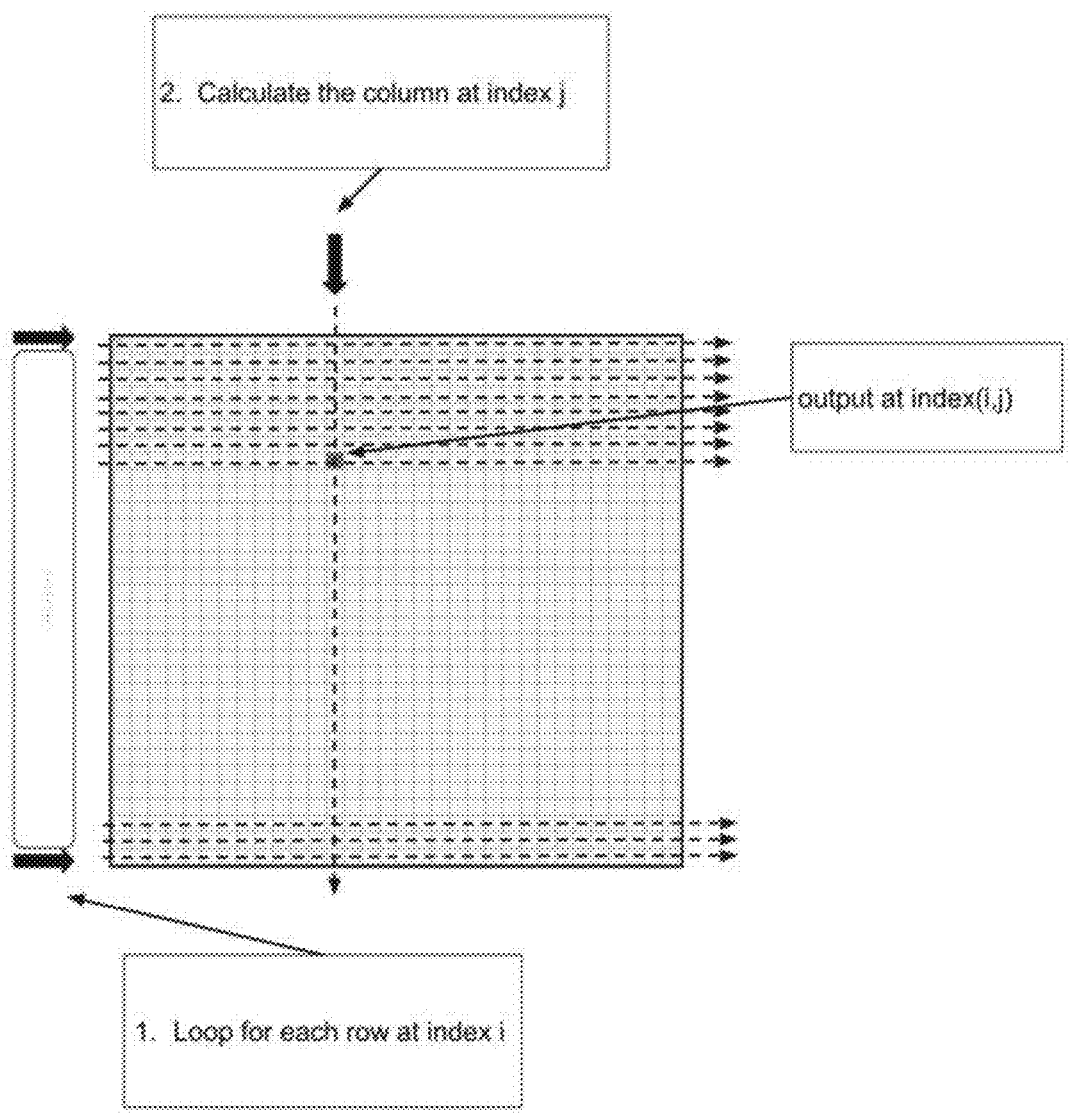
FIG. 7 shows how a full 2D implementation will computationally not be ideal.

Meaning that parallel processing would not be possible. Secondly, the calculations would still not be truly sparse. FIG. 7 illustrates this. In the figure the required calculations are shown for a 2D implementation where the frequency domain value in the index (i, j) is required. In FIG. 7 the option is shown where first the rows are calculated then the columns. The 1D calculations would first have calculated the values for each row at index i. After this the 1D calculation for the column can be calculated be done to get the value at index j. It will be clear that computationally this is not ideal. It will also be clear to experts in the field of frequency domain transformations that a 2D implementation of Göertzel will change the data in such a way that the original image cannot be re-created in a return to the spatial domain. However, as stated before this method describes the classification of data by solely using the frequency domain date. Therefore, the driver in the method described here is to have as fast as possible calculations generating the best possible input for the classifiers instead of the driver being the spatial domain data.

Next this disclosure will describe a series of options to have optimized data for classifiers, both in terms of speed and detection. In particular, it will be described how temporal data in a video stream is best captured.

These are, among others:
Using a multitude of features, each of which uses two zones;
Choose number of frames in a sequence of a video stream that are covered by the features and zones;
Choose a different target frequency for each zone;
Have two inputs for each zone, each of which is a frequency domain transformation;
Have a variable core filter for each input which can be optimized for both the real and imaginary parts of the transformation;
Have a variable sequence and shape of the inputs for the loop that defines the frequency domain transformation of each index;
Use the pair of features of each feature to generate a normalized complex vector for each feature; and
Finally, combine the all the normalized complex vectors together in a single format.

Figure 8:
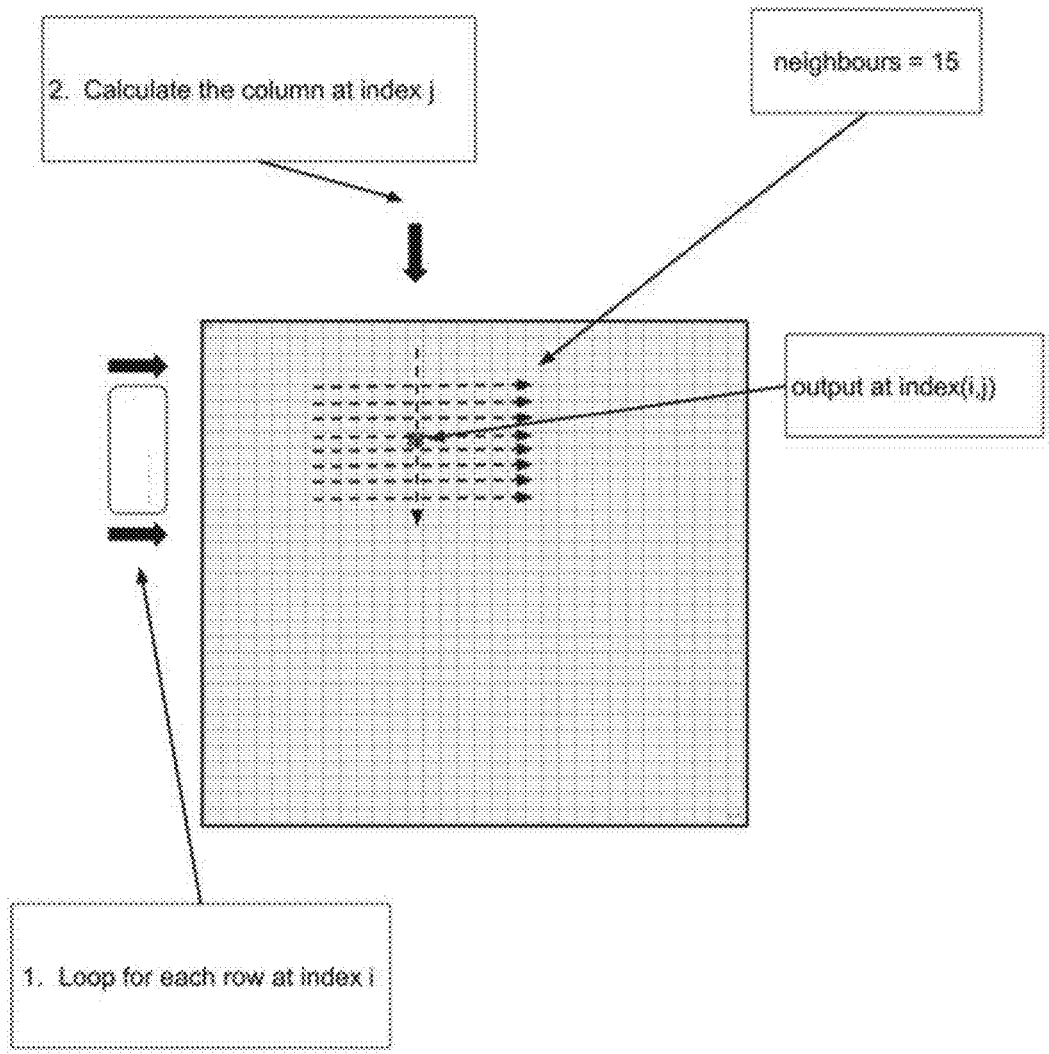
FIG. 8 shows how a full 2D implementation can be made faster, even if still not ideal.

The calculations can be made sparser than the example in FIG. 7. One way is as shown in FIG. 8, where the input cells for the transformation into the frequency domain are only taken around the position of the index for which the value is needed. However, this would still require the rows to wait for the results of the columns, or vice versa. An advantage would be that the length of the amount of cells could become an input parameter, allowing for more differentiation between features, while it could also be possible to capture details of the object being classified.

Figure 9:
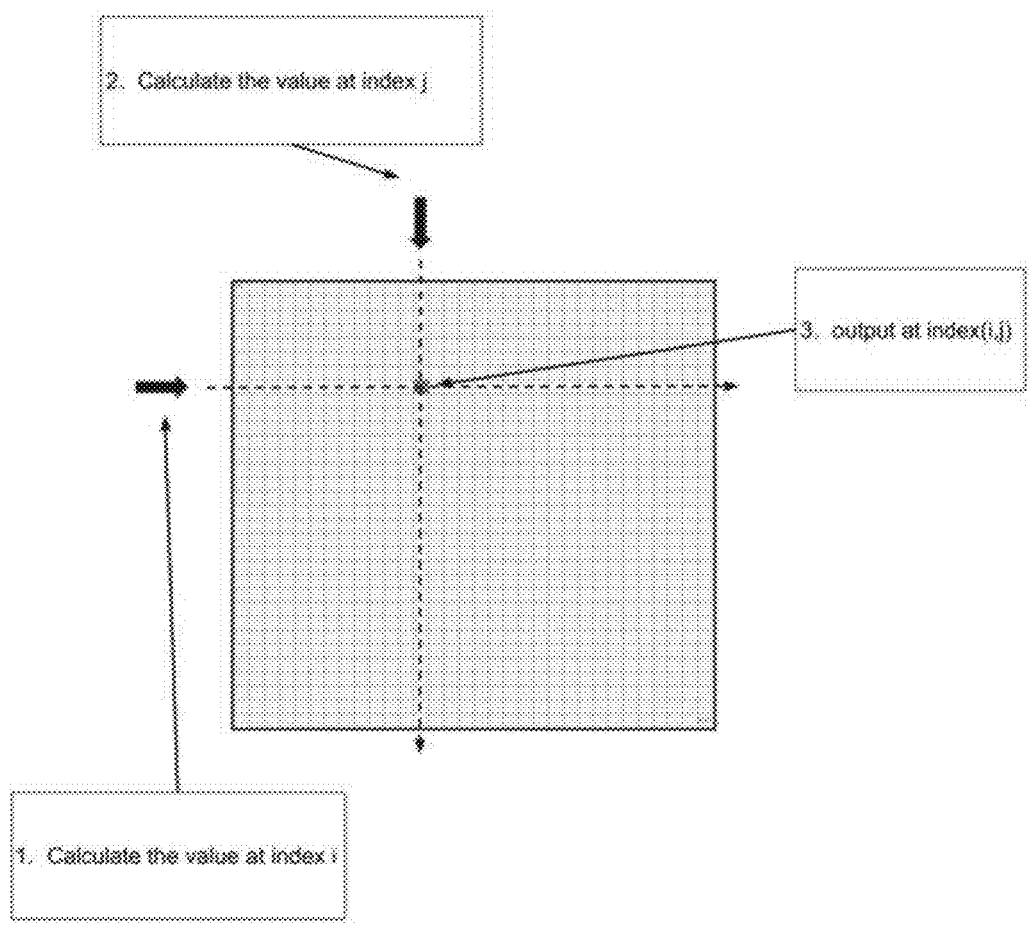
FIG. 9 shows how it is efficient if the result of the index is taken by separately calculating the 1D output for the row and column at the index and then combining this into a single value.
Figure 10:
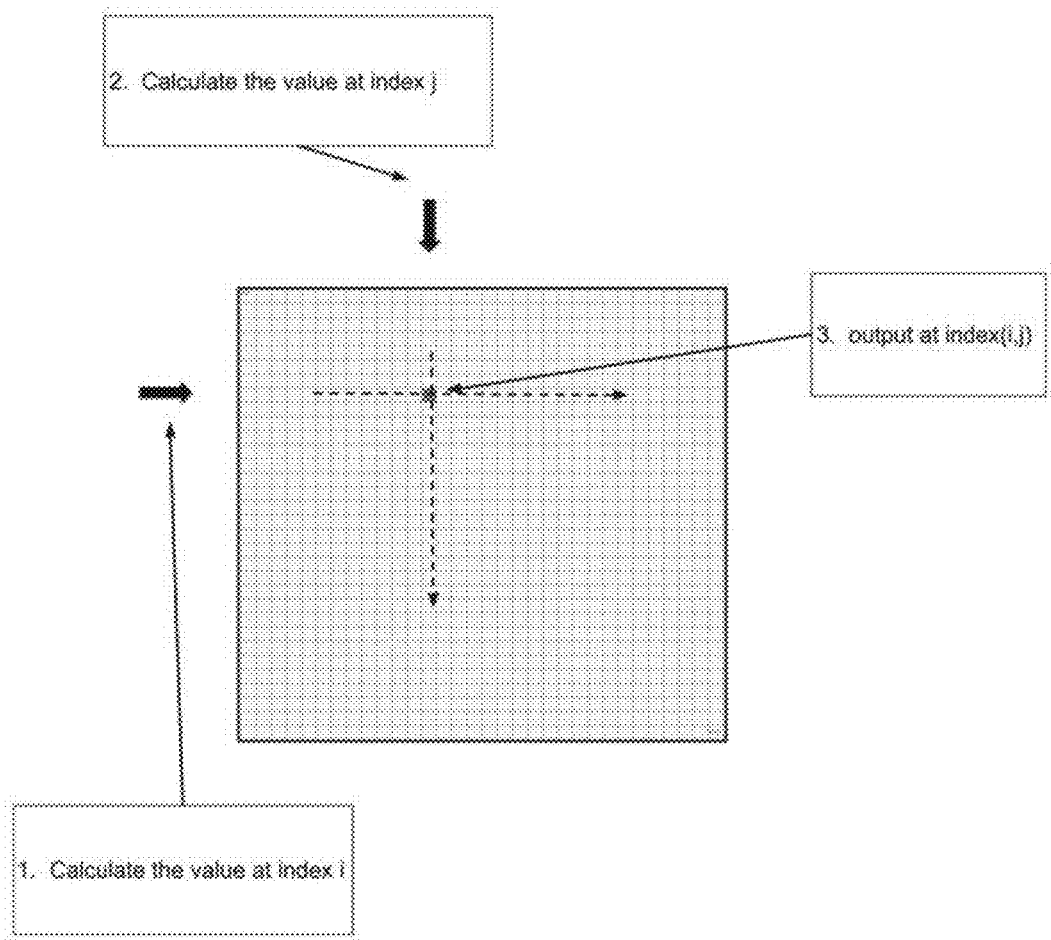
FIG. 10 shows how the computations can be made faster; the input cells for the transformation into the frequency domain are only taken around the position of the index for which the value is needed.

A more effective calculation is shown in FIG. 9. Here the result of the index is taken by separately calculating the 1D output for the row and column at the index and then combining this into a single value. Apart from the gain in speed, the biggest advantage in this manner is that it makes no difference if the 1D for the row or the 1D for the column is calculated first, so the value for the row and column can be calculated in parallel. An even great speed gain can be achieved by limiting the length of the input as shown in FIG. 10, where in this case only a single row and column input need to be calculated.

Figure 11:
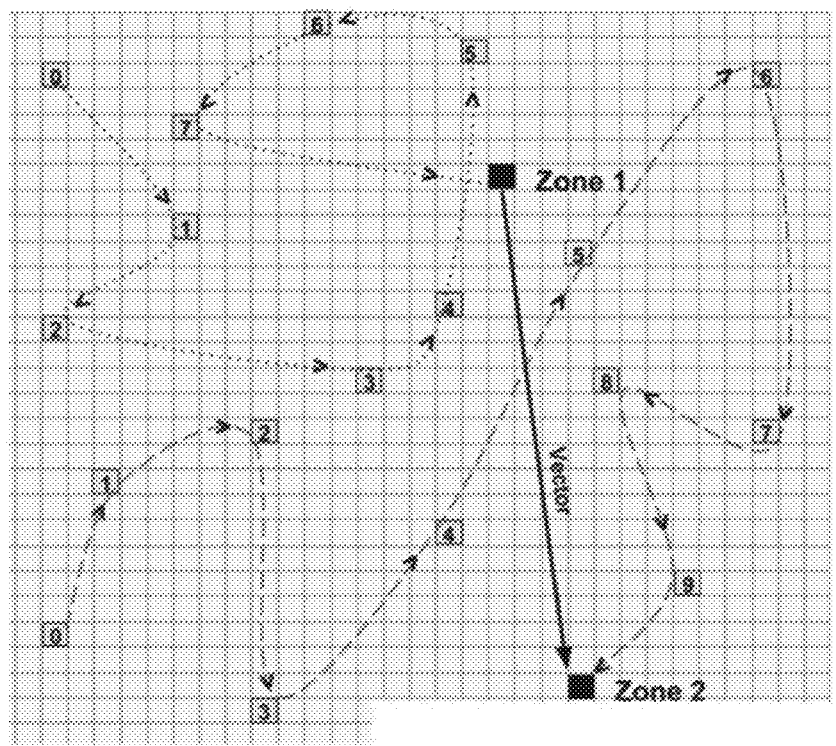
FIG. 11 shows how inputs for the zones are not limited to just rows and columns as inputs, but can be any free shape.

The amount of freedom to train the classifiers with frequency domain input data becomes even greater if you consider that the 2 inputs followed to get a result in a given zone index don't even need to be along the row and column or even adjacent cells, as FIG. 11 shows.

Figure 12:
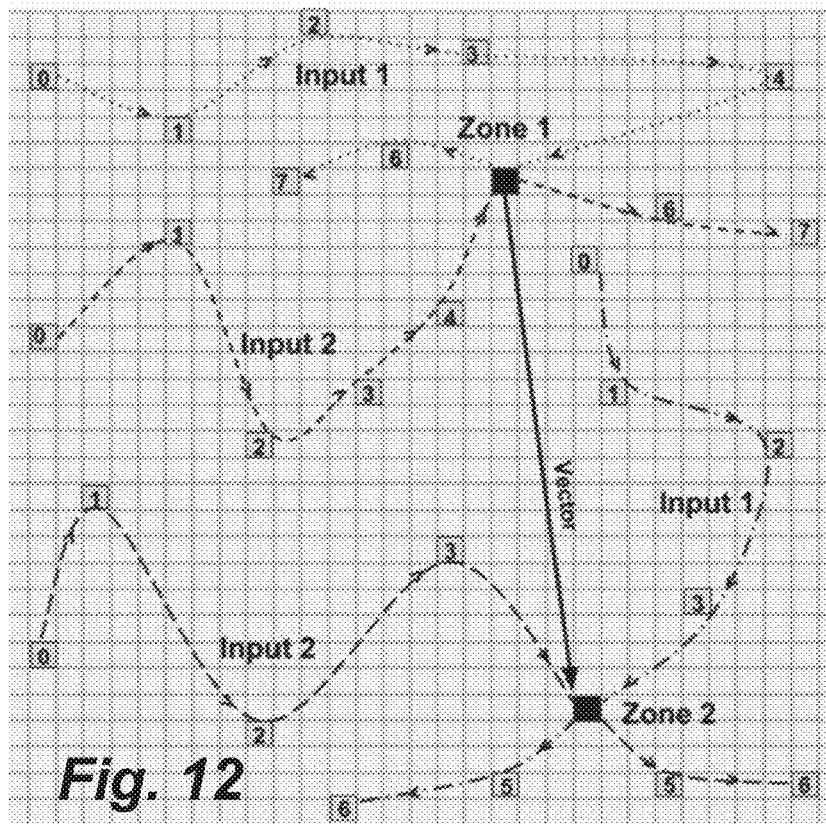
FIG. 12 shows how each zones has two inputs, which can be any free shape.

In the following description often a single input is shown per zone, to keep the figures more schematic. However it should be underlined that there are two inputs for each zone, as shown in FIG. 12.

Figure 13:
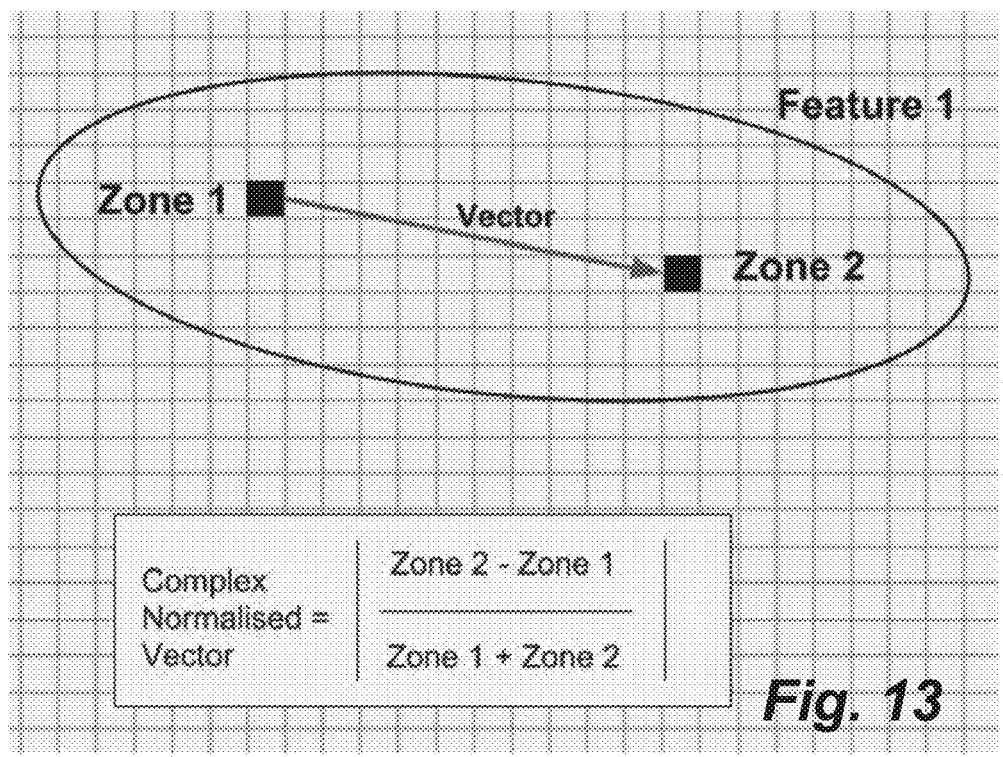
FIG. 13 shows how two zones form a feature, which with a normalization becomes a complex vector giving the information shift between the two zones.

A frequency domain transformation is done for each input, giving a real and an imaginary number. As mentioned, each zone has two inputs and in the following the manner in which to combine them into a single normalized complex value is described. This is also shown in FIG. 13.

First the two real inputs of zone 1 are combined:

$$\text{Real}(\text{Zone1}_{Feature_i}) = \qquad \text{(Equation 23)}$$
$$\sqrt{\text{Real}(\text{Input1}_{Zone1})^2 + \text{Imag}(\text{Input1}_{Zone1})^2} +$$
$$\sqrt{\text{Real}(\text{Input2}_{Zone1})^2 + \text{Imag}(\text{Input2}_{Zone1})^2}$$

The two imaginary inputs of zone 1 are combined to give a phase:

$$\text{Imag}(\text{Zone1}_{Feature_i}) = \qquad \text{(Equation 24)}$$
$$\angle\left(\frac{\text{Imag}(\text{Input1}_{Zone1})}{\text{Real}(\text{Input1}_{Zone1})}\right) + \angle\left(\frac{\text{Imag}(\text{Input2}_{Zone1})}{\text{Real}(\text{Input2}_{Zone1})}\right)$$

The same process is repeated for the two real and imaginary inputs of zone 2:

$$\text{Real}(\text{Zone2}_{Feature_i}) = \qquad \text{(Equation 25)}$$
$$\sqrt{\text{Real}(\text{Input1}_{Zone2})^2 + \text{Imag}(\text{Input1}_{Zone2})^2} +$$
$$\sqrt{\text{Real}(\text{Input2}_{Zone2})^2 + \text{Imag}(\text{Input2}_{Zone2})^2}$$

$$\text{Imag}(\text{Zone2}_{Feature_i}) = \qquad \text{(Equation 26)}$$
$$\angle\left(\frac{\text{Imag}(\text{Input1}_{Zone2})}{\text{Real}(\text{Input1}_{Zone2})}\right) + \angle\left(\frac{\text{Imag}(\text{Input2}_{Zone2})}{\text{Real}(\text{Input2}_{Zone2})}\right)$$

Next the results for the real values of zone 1 and zone 2 are combined in a normalization:

$$\text{Real}(\text{Feature}_i) = \left|\frac{\text{Real}(\text{Zone2}) - \text{Real}(\text{Zone1})}{\text{Real}(\text{Zone1}) + \text{Real}(\text{Zone2})}\right| \qquad \text{(Equation 27)}$$

This is also done for the imaginary values of zone 1 and zone 2:

$$\text{Imag}(\text{Feature}_i) = \left|\frac{\text{Imag}(\text{Zone2}) - \text{Imag}(\text{Zone1})}{\text{Imag}(\text{Zone1}) + \text{Imag}(\text{Zone2})}\right| \qquad \text{(Equation 28)}$$

In this manner each pair of zones that forms 1 feature gives a normalized complex vector, as shown in FIG. 13:

$$\vec{V}_{Feature_i} = \text{Real}(\text{Feature}_i) + j\text{Imag}(\text{Feature}_i) \qquad \text{(Equation 29)}$$

A model can be built up with a multitude of such normalized complex vectors:

$$\vec{\mathbb{V}}_{Feature}\{\vec{V}_{Feature_1}, \vec{V}_{Feature_2}, \ldots, \vec{V}_{Feature_n}\} \qquad \text{(Equation 30)}$$

It is this format of a multitude of normalized complex vectors that is the input that the method here describes gives as a new type of input for classifiers. It will be clear to experts in the art that this format allows for all the mathematics of probability theory and quantum physics to be applied for the classification.

The number of frequency domain calculations required to obtain the value in an index will have been strongly reduced in the method described, compared to having pixels in the spatial domain as inputs to a classifier. The values obtained in this way will still be strongly correlated with the shape information in the frequency domain, while also allowing a lot of control de reduce effects like aliasing and periodic signals. The reduction of these effects is important because one key aim is to have a unique result in each index. Here it needs to be noted again that, for this method, it is not required to have all the data to rebuild the image in the spatial domain. The goal is the capturing of the frequency domain information that sparsely encodes position and movement of the object being detected.

It is clear that the created frequency domain space very strongly reduces the amount of parameters that the classifier needs to process, when compared to directly using the pixel inputs in the spatial domain. This advantage is exponentially amplified when the method described is used to capture temporal information which can only be detected in a sequence of frames in a video stream.

Returning to the 1D calculations along each index, which do not need to be along a row or column, but are free, we can re-write them as follows:

$$k = (Int)\left(0.5 - \frac{N - \text{Target\_frequency}}{\text{Sample\_rate}}\right) \quad \text{(Equation 31)}$$

$$\omega = \left(\frac{2\pi k}{N}\right) \quad \text{(Equation 32)}$$

$$\text{coeff} = 2 \cdot \text{digital\_filter} \quad \text{(Equation 33)}$$

$$\text{digital\_filter} = \sin(A\omega + b\pi) + j\sin\left(A\omega + (2b+1)\frac{\pi}{2}\right) \quad \text{(Equation 34)}$$

$$S_0 = \text{coeff} \cdot S_1 - S_2 + \text{sample} \quad \text{(Equation 35)}$$
$$S_1 = S_0$$
$$S_2 = S_1$$

$$\text{Real} = (S_1 - S_2 \cdot \sin(A\omega + b)) \quad \text{(Equation 36)}$$

$$\text{Imag} = \left(S_2 \cdot \sin\left(A\omega + b\frac{\pi}{2}\right)\right) \quad \text{(Equation 37)}$$

We see how in this method the transfer function has been rendered tunable, with the parameters a and b, for both the real and imaginary parts of the frequency domain transformations.

It should be noted that these transfer function, operated as a digital filter, has options which can be chosen separately for each for each input of a zone, meaning that the first input and second input can have different discrete transfer function settings.

As mentioned before, one of the advantages of this method is that the many options described also for a large amount of freedom in tuning the frequency domain data to be cleaned before being used as an input for the classifiers.

Figure 14:
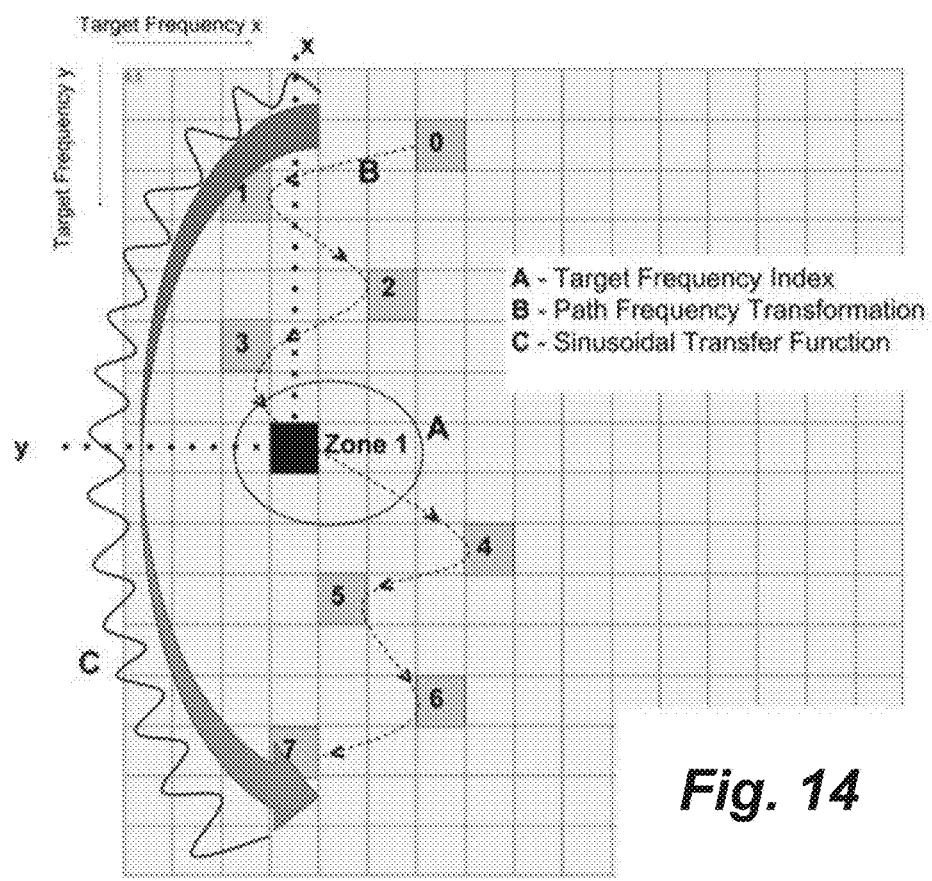
FIG. 14 shows how each index has a target frequency, underlying transfer function for the transformation and a specific feature shape which defines the direction and sequence of the inputs of the frequency domain transformation

This is shown in FIG. 14. We see how for each input there is freedom to choose the targeted frequency, the direction and sequence of inputs that are used in the core loop and the transfer functions used within the core loop.

Figure 15:
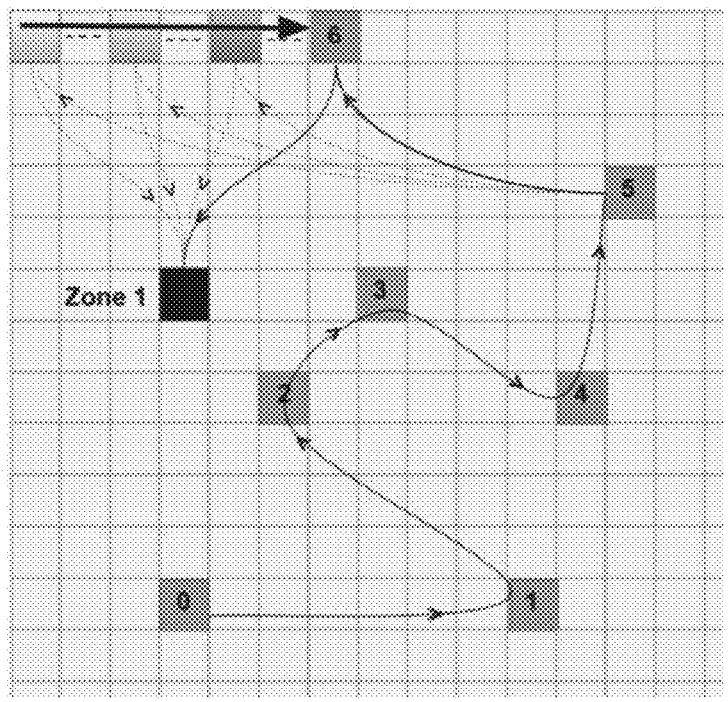
FIG. 15 shows how the shape of the input for the frequency domain transformations can be optimized by sequentially moving each index of the input.

FIG. 15 shows how the direction and sequence of the inputs for the core inner loop can be adjusted in an optimization phase.

It will be clear that at this point the calculations in this method are very different from the theory that uses the L-Transformation (Equation 7) to create the Goertzel algorithm. It is also substantially different from the Z-Transformation, which is connected to the L-Transformation. For the sake of the description, we call here the transformation used in this method a 2D variation of the L-Transformation.

Figure 16:
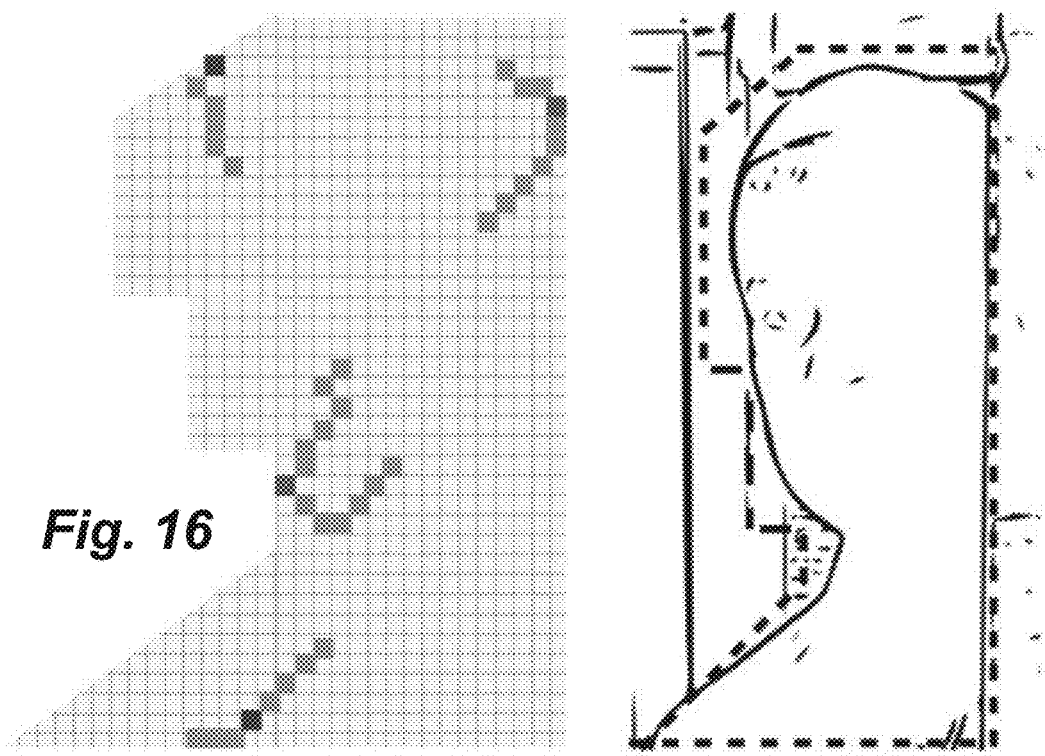
FIG. 16 shows how the input images can be any shape, are not limited to squares and rectangles.

It will be clear to a man skilled in the art that with this method only the frequency domain values in the indexes that contain the features need to be calculated. While in the case of using FFT, all values in the frequency domain would have to be calculated, since FFT cannot be calculated sparsely. It is also important to underline again that this method does not have the limitation of image input size like FFT. In fact there is not even there limitation of having a square or rectangle input image size, as is shown in FIG. 16.

Next, the application of the method to extracting temporal information from a sequence of video frame is described.

Figure 17:
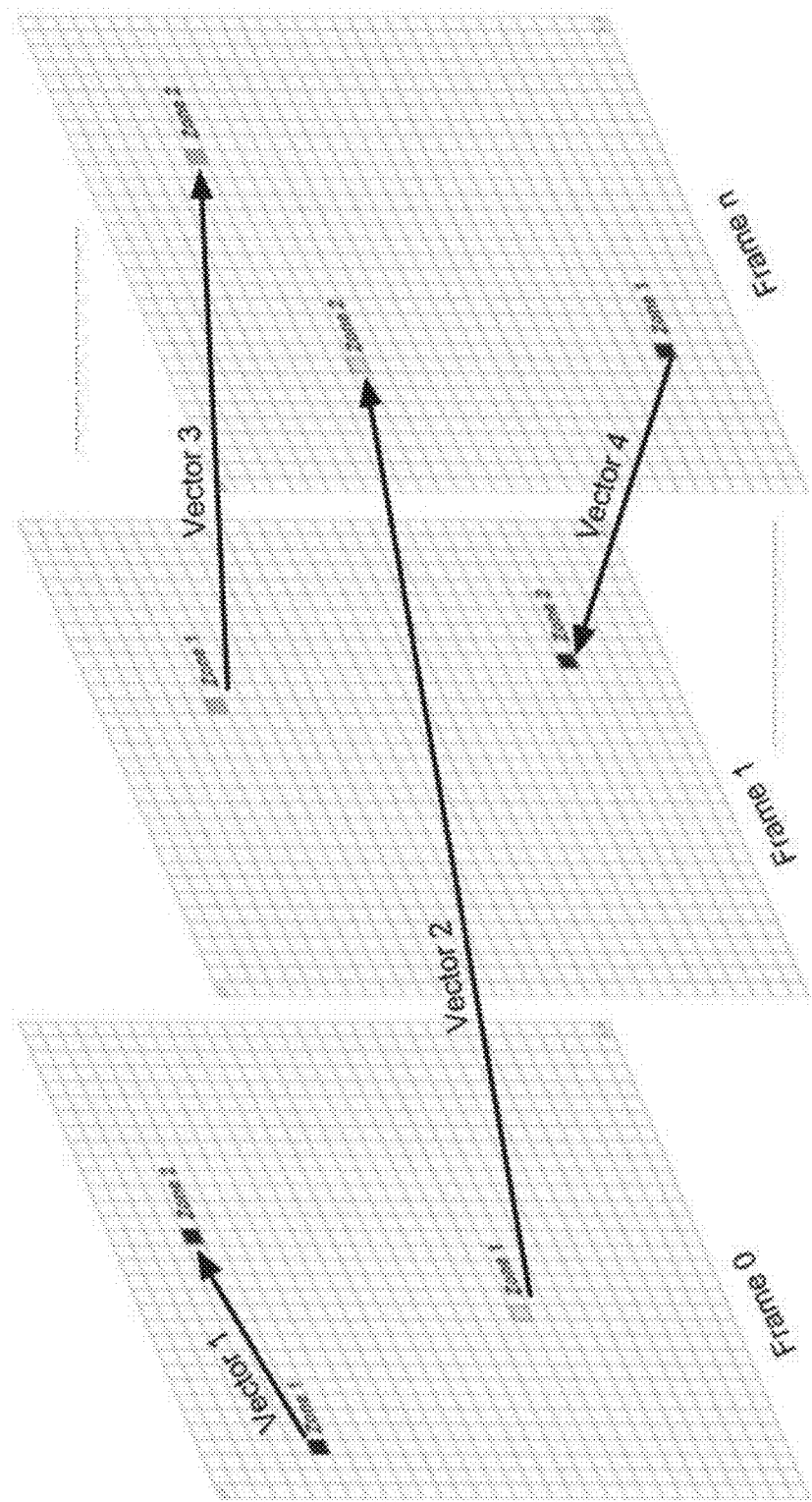
FIG. 17 shows how zones and features can cross-reference data in a sequence of frames in a video stream.
Figure 18:
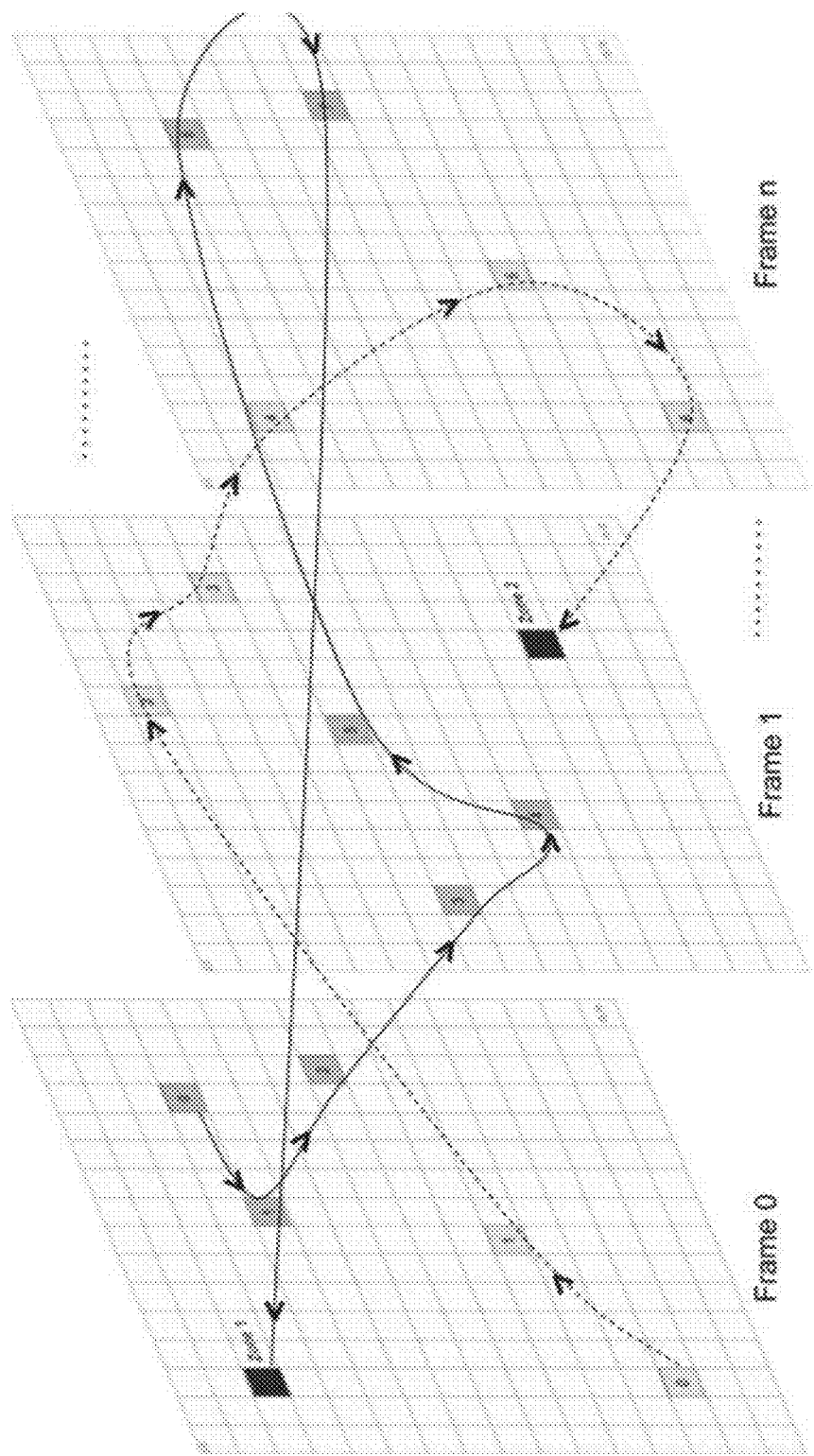
FIG. 18 shows the shapes which define the sequence of the frequency domain transformation of each index are not limited to single frames but can cross-reference a multiple frames in a video stream.

FIG. 17 shows how each pair of zones that forms a feature need not necessarily be in the same frame of a video sequence. While FIG. 18 shows how the direction and sequence of each input of the core inner loop can take a path which is not limited to a single frame of a sequence of video frames. It will be clear to experts that if the pixels are directly used as input from the spatial domain, the permutations to solve when cross-referencing pixels between frames of a video sequence will be much slower and much more difficult to train compared to the method described herein.

Figure 19:
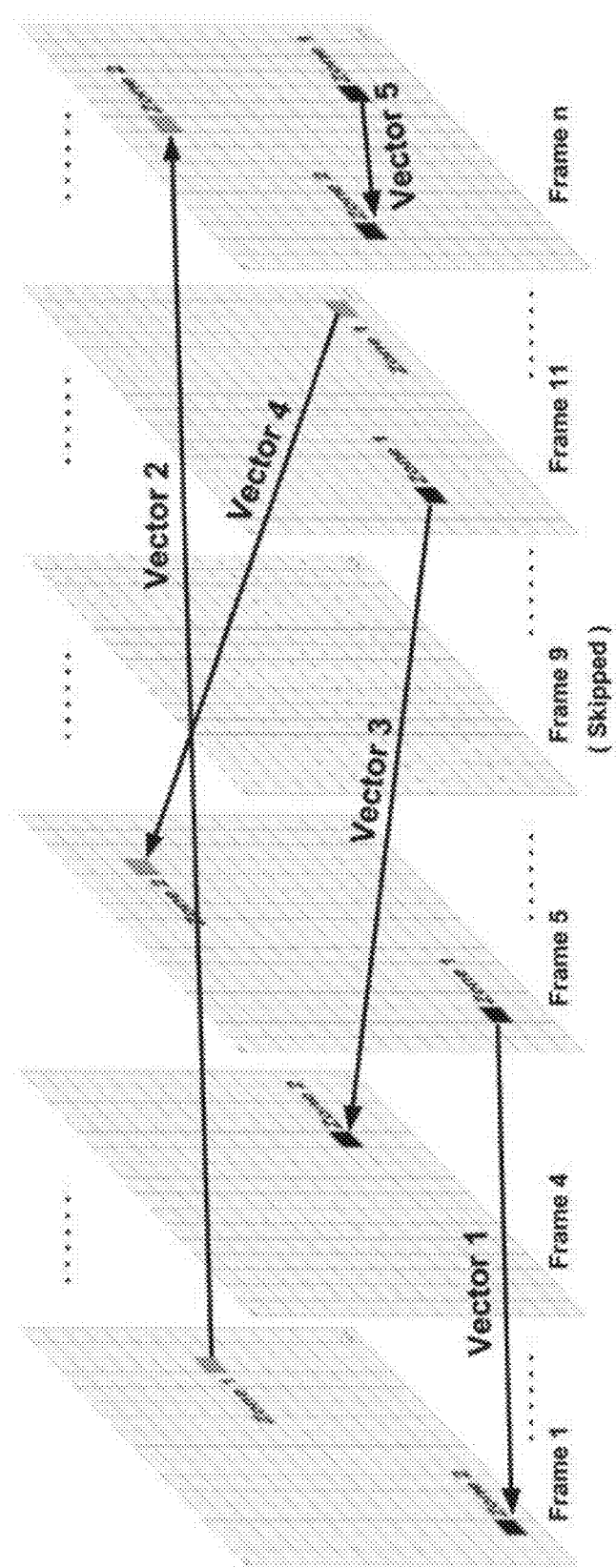
FIG. 19 illustrates the freedom that the method permits in the choice of the sequence of frames used to generate the frequency domain transformations of the model, allowing for true temporal data to be used for the detection of content.

FIG. 19 illustrates the freedom that the method permits in the choice of the sequence of frames used to generate the frequency domain transformations of the model, allowing for true temporal data to be used for the detection of content.

Figure 20:
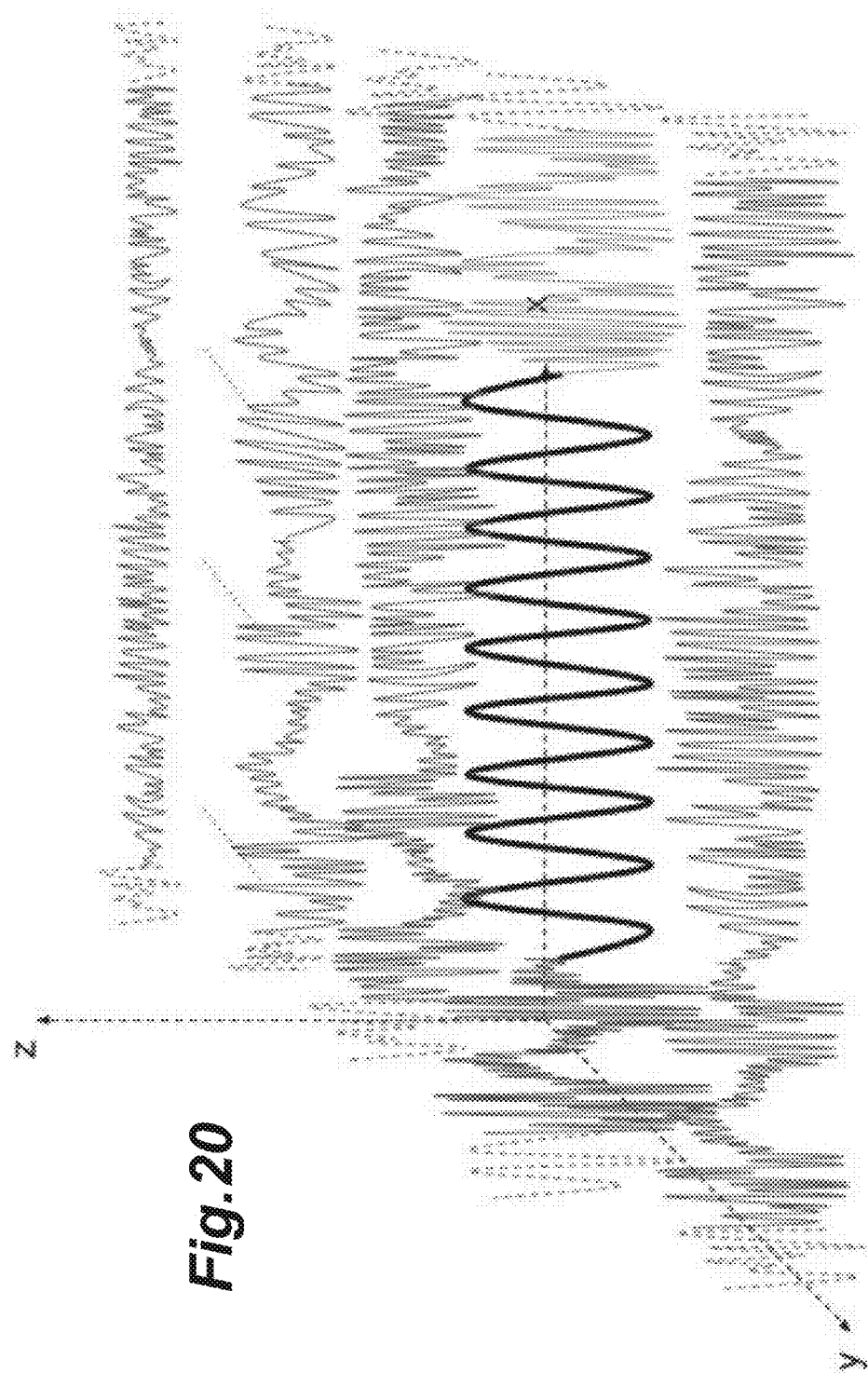
FIG. 20 show how an optimization in the frequency domain has the very big advantage of being clear signals in a very large multi-dimensional area of noise, allowing for now types of logic of not just supervised but also unsupervised learning

We also see in FIG. 20 how working in the frequency domain has big advantage compared to the spatial domain of pixels. Whereas in the spatial domain each pixel has an input between 0 and 255, without much possibility to reason on the goodness of the pixels, instead in the frequency domain the search space in the frequency domain is for the greatest part made up of a great deal of noise, with the signals clearly standing out. Hence the method described herein also has the potential for more effective optimization logics, basic on signal quality, which potentially can also be done in an unsupervised manner.

Figure 21:
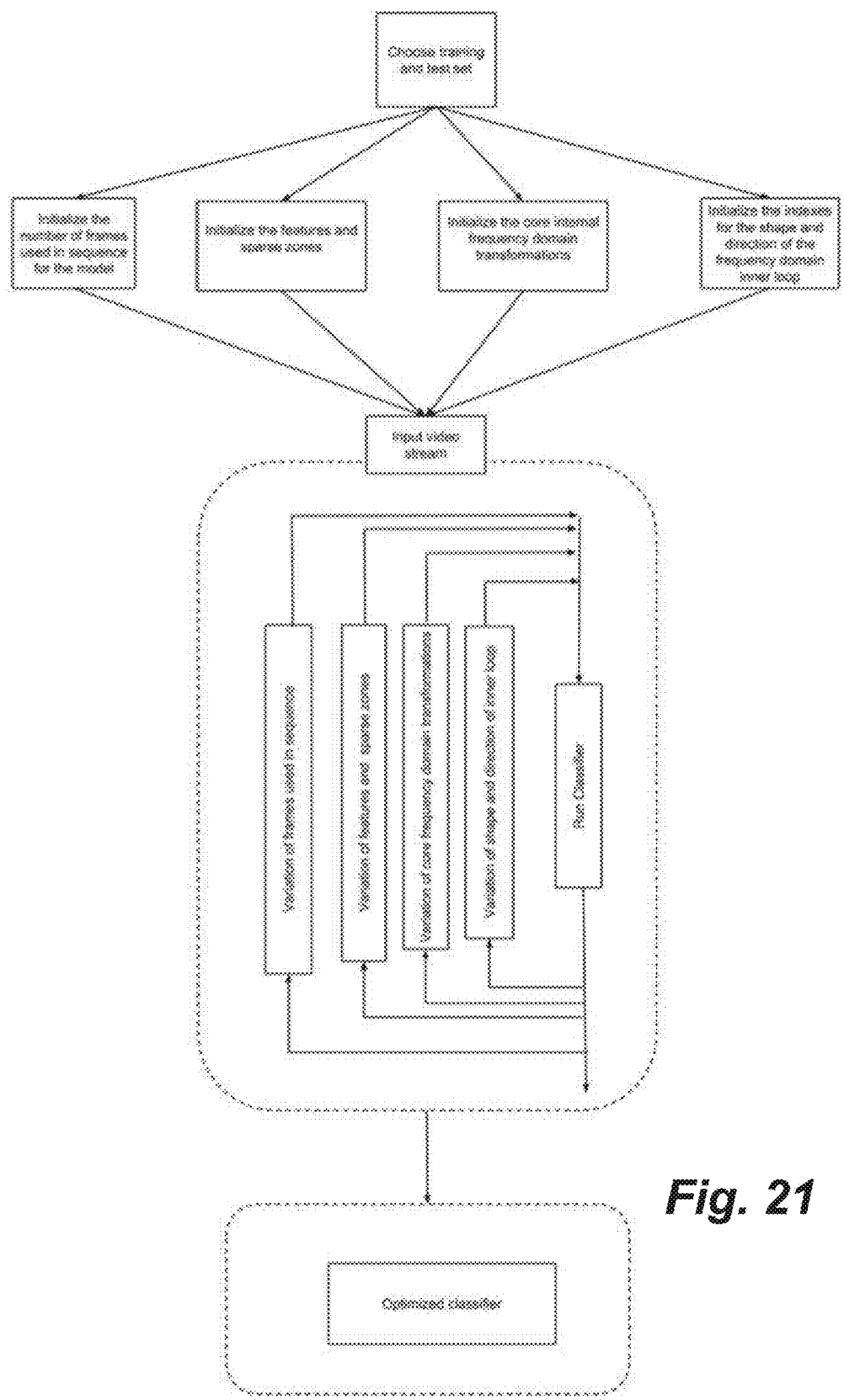
FIG. 21 shows the flow diagram which is an example of a possible optimization logic for the method described.

FIG. 21 shows a possible higher level diagram of a training that can be used for the method described when using the method to create models which detect temporal effects in a sequence of video frames. FIG. 21 shows how the number of frames used in sequence is a variable and then for each index of each feature, as also shown in FIG. 14, the target frequency is optimized, the sequence of the underlying loop is chosen and the underlying transfer functions used within the loop is optimized. This is done for both the real and imaginary parts of each loop. The output of the optimization will be a format with a multitude of normalized complex vectors, which can be used as a particularly effective input for the detection and classification of temporal effects in a sequence of video frames, although the method is not limited to such implementations.

The invention claimed is:

1. A method for content detection to be carried out by an electronic processing unit, based either on images or on a digital video stream of images, the images being defined by a single frame or by sequences of frames of said video stream, with the aim of enhancing and then isolating frequency domain signals representing a content to be identified, and decreasing or ignoring frequency domain noise with respect to the content within the images or the video stream, comprising the steps of:
  obtaining a digital image or a sequence of digital images from either a corresponding single frame or a corresponding sequence of frames of said video stream, all the digital images being defined in a spatial domain;
  selecting one or more pairs of sparse zones, each covering at least a portion of said single frame or at least two frames of said sequence of frames, each pair of sparse zones generating a feature, each zone being defined by two sequences of spatial data;
  transforming said features into frequency domain data by combining, for each zone, said two sequences of spatial data through a 2D variation of an L-transformation, varying the transfer function, shape and direction of the frequency domain data for each zone, thus generating a normalized complex vector for each of said features;
  combining all said normalized complex vectors to define a model of the content to be identified, usable as an input for a content classifier.

2. The method for content detection as defined in claim 1, wherein the step of transforming the selected features into frequency domain data uses spatial data from a varying number/choice of frames.

3. The method of content detection according to claim 1, wherein a search logic is used on the full input image to generate an input frame where said sparse zones are identified.

4. The method of content detection according to claim 1, wherein said sparse zones are grouped together, either possibly partially overlapping each other or placed side-to-side, to increase a local resolution of said digital image at said sparse zones.

5. The method of content detection according to claim 1, wherein the transforming the selected features into frequency domain data is carried out in parallel with respect to said two sequences of spatial data.

6. The method of content detection according to claim 1, wherein, in the transforming step, first 1D Göertzel calculations are performed by rows and then the results are used for a second step wherein 1D Göertzel calculations are performed by columns, or vice versa.

7. The method of content detection according to claim 1, wherein, for each sparse zone of a pair, different target frequencies are chosen.

8. The method of content detection according to claim 1, wherein input cells of digital images for the step of transforming into the frequency domain data are only taken around a position for which a transforming computing is needed.

9. The method of content detection according to claim 8, wherein the transforming computing of the position is taken by separately calculating the 1D output for the row and column at the position and then combining this into a single value.

10. The method of content detection according to claim 1, wherein the transfer function is chosen separately for each input of a sparse zone, so that the first input and second input have different discrete transfer function settings.

* * * * *